United States Patent
Komiya et al.

(10) Patent No.: US 7,025,796 B2
(45) Date of Patent: Apr. 11, 2006

(54) METHOD FOR EVALUATING THE QUALITY OF ABRASIVE GRAINS, POLISHING METHOD AND ABRASIVE FOR POLISHING GLASS

(75) Inventors: Hirotsugu Komiya, Kanagawa (JP);
Sumihisa Yamaguchi, Kanagawa (JP);
Tetsufumi Hisatsune, Kanagawa (JP);
Atsuyoshi Takenaka, Kanagawa (JP);
Shigeaki Yonemori, Kanagawa (JP)

(73) Assignee: Seimi Chemical Co., Ltd., Chigasaki (JP)

( * ) Notice: Subject to any disclaimer, the term of this patent is extended or adjusted under 35 U.S.C. 154(b) by 109 days.

(21) Appl. No.: 10/717,550

(22) Filed: Nov. 21, 2003

(65) Prior Publication Data

US 2004/0139764 A1    Jul. 22, 2004

(30) Foreign Application Priority Data

Nov. 22, 2002 (JP) .............................. 2002-338887
Feb. 14, 2003 (JP) .............................. 2003-037127

(51) Int. Cl.
*B24B 9/08* (2006.01)
*C09K 3/14* (2006.01)

(52) U.S. Cl. ............................ 51/307; 51/309; 106/3; 423/263; 451/41

(58) Field of Classification Search ................ 51/309, 51/307; 106/3; 423/263; 451/41
See application file for complete search history.

(56) References Cited

U.S. PATENT DOCUMENTS 6,358,853 B1 *  3/2002  Cadien et al. .............. 438/692
6,843,816 B1 *  1/2005  Ito et al. ...................... 51/307

FOREIGN PATENT DOCUMENTS

EP           1243633      *  9/2005
WO       WO02/062917    *  8/2002

* cited by examiner

*Primary Examiner*—Michael Marcheschi
(74) *Attorney, Agent, or Firm*—Oblon, Spivak, McClelland, Maier & Neustadt, P.C.

(57) ABSTRACT

A method for evaluating the quality of abrasive grains for polishing glass, which comprises adding abrasive grains to be measured, to an aqueous medium having silica dissolved therein, to have the silica adsorbed on the abrasive grains under such a condition that the silica undergoes substantially no polymerization in the aqueous medium, followed by solid-liquid separation to separate the abrasive grains from the mother liquor, and measuring the concentration of silica remaining in the mother liquor to measure the adsorption rate ($\eta$) of silica on the abrasive grains.

15 Claims, 1 Drawing Sheet

METHOD FOR EVALUATING THE QUALITY OF ABRASIVE GRAINS, POLISHING METHOD AND ABRASIVE FOR POLISHING GLASS

BACKGROUND OF THE INVENTION

1. Field of the Invention

The present invention relates to an abrasive for polishing glass. More particularly, it relates to an abrasive for polishing glass, which is suitable for finish polishing various types of glass materials and which comprises, as the main component, a rare earth oxide containing cerium oxide and is particularly excellent in the durability of a high polishing rate, and a method for evaluating the quality of abrasive grains.

2. Discussion of Background

In recent years, glass materials are used in various applications. Among them, particularly in e.g. a glass substrate for an optical disk or magnetic disk, a glass substrate for a display such as an active matrix type LCD, a color filter for liquid crystal TV, a watch, a desk-top calculator, LCD for camera or a solar cell, a glass substrate for a LSI photomask, or an optical lens or a glass substrate for an optical lens, it is required to polish the surface highly precisely.

Heretofore, as an abrasive to be used for surface polishing of such glass substrates, an abrasive comprising a rare earth oxide, particularly cerium oxide, as the main component, has been used, because cerium oxide as abrasive grains for polishing has a merit in that its efficiency for polishing glass is superior by a few times as compared with zirconium oxide or silicon dioxide. Further, in recent years, a higher quality is required also in the polishing ability of the abrasive. For example, along with an increase in the amount of image information or moving image information, a higher recording density (from about a few tens giga to over 100 giga) is required for built-in HDD (hard disk drive/magnetic disk) in e.g. a personal computer, a DVD recorder or a car navigation, and it is required to polish the substrate surface more precisely and flatly. In HDD, the space between the magnetic surface and the magnetic head flying by so-called CSS (contact start stop) is now at most 0.1 μm.

Further, the abrasive comprising cerium oxide as the main component for polishing glass usually contains a fluorine content for the purpose of improving the polishing performance.

Heretofore, various methods are known as methods for producing abrasives containing a fluorine content.

For example, in a method wherein a bastnaesite concentrate (rare earth fluoride carbonate) is, for example, selectively used as a material initially containing a fluorine content, fluorine is already contained in the concentrate, whereby it is possible to obtain a final product abrasive which also contains fluorine.

Further, a method for adding and incorporating cerium fluoride as a fluorine content to an abrasive, is also proposed (JP-A-6-330025).

On the other hand, a method is also known wherein a rare earth carbonate is used as a starting material and is partially fluorinated by hydrofluoric acid, followed by drying and calcination, to obtain an abrasive which comprises cerium oxide as the main component and which contains fluorine, or as a method wherein no partial fluorination by hydrofluoric acid is carried out, a method is proposed wherein alkali metals, alkaline earth metals and radio active substances are chemically separated to obtain a light rare earth starting material having their content reduced and comprising cerium as the main component, and a rare earth fluoride is added to such a starting material, followed by firing to make cerium oxide as the main component (JP-A-9-183966).

Further, a method which is understood to be an example belonging to the technical scope of the method as disclosed in the above-mentioned JP-A-9-183966, is also proposed. Namely, a method is disclosed in which a rare earth carbonate is used as a starting material, and it is calcined for thermal decomposition into a rare earth oxide, whereupon a rare earth fluoride is added thereto, followed by operation of pulverization, firing, crushing and classifying (JP-A-2002-224949).

Further, it is regarded as preferred that the content of the fluorine content in the abrasive is, for example, within a range of from about 3 to 9 mass %. If the fluorine content is too small, it is not possible to sufficiently change lanthanum oxide to lanthanum oxyfluoride (LaOF) for fixing, whereby the polishing rate tends to be low. The presence of strongly basic lanthanum oxide is likely to cause clogging of a polishing pad during polishing, which adversely affects refreshing by circulation of the abrasive slurry to the polishing surface. On the other hand, if the fluorine content is too much, the excess rare earth fluoride is likely to undergo sintering during firing, such being undesirable (JP-A-9-183966).

Further, with respect to an abrasive comprising cerium oxide as the main component, it has been proposed that an abrasive whereby in the characteristics of the powder X-ray diffraction analysis, the ratio of the peak intensity of rare earth oxyfluoride, etc. to the maximum peak (rare earth oxide) intensity in the X-ray diffraction shows a specific range, is excellent in the polishing characteristics (JP-A-2002-97457 and JP-A-2002-224949).

Further, with respect to the grain diameter distribution of an adhesive, it is generally accepted that when one having a $d_{90}/d_{10}$ ratio of the average grain diameters in the cumulative grain diameter distribution within a specific range, is used, it is possible to increase the polishing rate and to minimize formation of scratches or the like on the polished surface (JP-A-2002-194334).

However, even if the fluorine content, the powder X-ray diffraction pattern and the particle size distribution, etc. are adjusted to be in the preferred ranges as proposed above, the above-mentioned conventional adhesive comprising cerium oxide as the main component is still not free from the following undesirable phenomenon, and it is not necessarily satisfactory from the viewpoint of the durability of the polishing performance to continuously maintain a high polishing rate while maintaining the quality of the polished surface of the glass.

Here, the basic mechanism in glass polishing and elution of the substrate components will be described as follows.

Namely, as an abrasive for polishing glass, usually, abrasive grains of e.g. cerium oxide type are dispersed in a liquid such as water and used in the form of an abrasive slurry. Further, in the case of continuous and large amount of surface polishing of a glass plate, it is common to use such an abrasive slurry by recycling and at the same time, the amount corresponding to a loss of the abrasive slurry taken out of the system as deposited on the polished glass plate, is supplemented as a fresh slurry from outside the system.

Polishing of glass by a cerium oxide type abrasive is generally regarded as a combination of mechanical polishing and chemical polishing (e.g. "Optical Glass" Tetsuro Izumitani and published by Kyouritsu Shuppan, 1984, p. 114–131, and Lee M. Cook, Chemical Processes In Glass Polishing, Journal of Non-Crystalline Solids, North-Holland 120(1990), p. 152–171). In these literatures, both the mechanical polishing mechanism and the chemical polishing mechanism in glass polishing are described in general.

Firstly, in the aspect of mechanical polishing of glass, the following formula (Preston formula) is introduced with respect to the polishing rate.

Preston Formula $$\Delta H/\Delta t = Kp*(L/A)*(\Delta s/\Delta t)$$

where $\Delta H/\Delta t$: the height $\Delta H$ of the substrate to be polished, which changes in time $\Delta t$.

L: Total load
A: Area of the substrate to be polished
$\Delta s$: The relative moving distance of the polishing tool on the glass surface, which moves on the surface to be polished.
Kp: Preston constant Another Expression of the Preston Formula $$\Delta H/\Delta t = (2E)^{-1}*P*(\Delta s/\Delta t)$$

where $\Delta H/\Delta t$: the height $\Delta H$ of the substrate to be polished, which changes in time $\Delta t$.

E: Young's modulus of the glass substrate
P: Pressure per area to which the load is exerted
$\Delta s$: The relative moving distance of the polishing tool on the glass surface, which moves on the surface to be polished.

$1/(2E)$: Preston constant=$Kp$

As in the above formulae, the polishing rate ($\Delta H/\Delta t$) based on the mechanical mechanism is expressed by the total load (or pressure), the relative moving speed of the polishing tool and the Young's modulus of the glass substrate.

On the other hand, with respect to the chemical polishing of glass, the following sequential mechanism model has been proposed.

Namely, ① firstly, a soft hydration phase is formed on the glass surface to which the load of abrasive particles is exerted, ② this hydration phase will be weakly bonded to active points on the surface of the abrasive grains and will be abraded off from the glass surface under the load by the abrasive grains, ③ thus, the glass hydration phase adsorbed on the surface of the abrasive grains will be hydrolyzed and detached from the abrasive grains, and the glass component (the main component is silica) is dissolved in water as the solvent, and ④ a process of adsorption of the dissolved silica on the abrasive grains or reprecipitation of silica will take place.

Here, the phenomenon of the reprecipitation of the silica dissolved in water is disclosed in detail also in the famous Iler's book relating to silica chemistry (Ralph K. Iler, The Chemistry of Silica, John Wiley & Sons, 1979 (reprint edition)). Namely, the polymerization speed of the dissolved silica is high when the dissolved silica concentration is high, and the pH dependency of the liquid is substantial, and particularly in a region where the pH is close to neutral, the polymerization-gelation speed of the dissolved silica is regarded to be high. The silica thus polymerized and gelled, will be reprecipitated in water as the solvent containing abrasive grains, but this hydrogel-state silica (the hydrogel-state silica will hereinafter be referred to as gelled silica) is fine and adhesive and acts as a binder for the abrasive grains. Accordingly, as the polymerized and gelled silica will be accumulated in the liquid along with the progress of polishing, it tends to partially cover the glass surface to be polished in such a form as if it binds the abrasive grains, whereby the abrasive grains will be solidified in such a form to cover the polishing pad, whereby the pad tends to be clogged, thus causing formation of scratches on the surface of the object to be polished. Consequently, it causes an undesirable phenomenon such that the quality of the polished surface or the polishing rate will be deteriorated.

As a method for solving such a problem, it has been proposed to add calcium secondary phosphate or the like to the abrasive grains, so that the abrasive grains will be readily redispersed (JP-A-50-13405). The addition of such component is effective to improve the dispersibility of the abrasive grains, but with respect to the quality of the polished surface, latent scratches are likely to be formed substantially, and such is not fully satisfactory especially for a glass substrate where high precision is required.

Further, as still another method, in an abrasive comprising, as the main component, a rare earth oxide containing cerium oxide, a slurry-state abrasive for polishing glass has been proposed in which cerium fluoride and a small amount of a calcium compound are incorporated (JP-A-6-330025, Japanese Patent No. 2832270).

In this method, the calcium compound dissolved in the abrasive slurry is supposed to provide effects in the state of calcium ions.

Each of the above-mentioned methods is effective to some extent for overcoming the problems, but it is susceptible to an influence of the physical properties of the formed grains delicately different depending upon the preparation method or conditions or selection of the starting material for the production of the abrasive comprising cerium oxide as the main component, whereby from the viewpoint of general applicability, it is difficult to provide the effects constantly, thus providing no essential solution.

SUMMARY OF THE INVENTION

The present inventors have conducted an extensive study to solve such problems and as a result, have found a surprising fact that the adsorption rate of silica on the abrasive is largely related to such a problem as a decrease in the polishing rate or a deterioration of the quality of the polished surface due to the above-mentioned polymerization of dissolved silica, which takes place when a rare earth oxide containing cerium oxide, is used as an abrasive for glass. And, surprisingly, it has been found that the grains comprising cerium oxide as the main component basically have an ability to adsorb such silica, and yet, the adsorption ability (represented by η) of silica on the grains is substantially different due to certain physical properties specific to the individual cerium oxide, and when this η has at most a certain value, the gelation can substantially be suppressed. The present invention has been accomplished on the basis of such discoveries.

The present invention has been made to solve the above-mentioned problems of the prior art, and particularly, it is an object of the present invention to provide an abrasive for polishing glass, which comprises, as the main component, a rare earth oxide containing cerium oxide and whereby the decrease of the polishing rate due to polymerization of dissolved silica is suppressed to provide an excellent polishing quality while maintaining a high polishing rate.

Further, it is another object of the present invention to provide a novel method for evaluating the polishing quality (in this specification, it may simply be referred to as "quality") of the abrasive for polishing glass, which may suitably be used to evaluate, select or identify the polishing ability of such a high quality abrasive for polishing glass.

Namely, the present invention provides the following:

(1) A method for evaluating the quality of abrasive grains for polishing glass, which comprises adding abrasive grains to be measured, to an aqueous medium having silica dissolved therein, to have the silica adsorbed on the abrasive grains under such a condition that the silica undergoes substantially no polymerization in the aqueous medium, followed by solid-liquid separation to separate the abrasive grains from the mother liquor, and measuring the concentration of silica remaining in the mother liquor to measure the adsorption rate ($\eta$) of silica on the abrasive grains.

(2) A method for polishing glass, wherein abrasive grains, of which the silica adsorption rate ($\eta$) as measured by the method as defined in (1) has at most a certain value ($\eta_0$), are selected or identified, and used for polishing glass.

(3) The method for polishing glass according to (2), wherein $\eta_0$ is 50%.

(4) An abrasive for polishing glass, which is an abrasive comprising, as the main component, a rare earth oxide containing cerium oxide, wherein the silica adsorption rate ($\eta$) on the abrasive grains, as measured by the method as defined in (1), is at most 50%.

(5) The abrasive for polishing glass according to (4), which further contains a fluorine compound.

(6) The abrasive for polishing glass according to (4) or (5), which further contains an alkaline earth metal sulfate compound and/or an alkaline earth metal phosphate compound.

(7) The abrasive for polishing glass according to (6), wherein the alkaline earth metal is at least one member selected from the group consisting of calcium, barium, magnesium and strontium.

(8) The method for polishing glass according to (2) or (3), wherein as the abrasive, one containing abrasive grains having a grain diameter of from 2 to 3 μm, of which the measured value of the average grain strength by a micro compression testing machine is from 10 to 300 MPa, is used.

(9) The abrasive for polishing glass according to any one of (4) to (7), which contains abrasive grains having a grain diameter of from 2 to 3 μm, of which the measured value of the average grain strength by a micro compression testing machine is from 10 to 300 MPa.

DETAILED DESCRIPTION OF THE PREFERRED EMBODIMENTS

Figure 1:
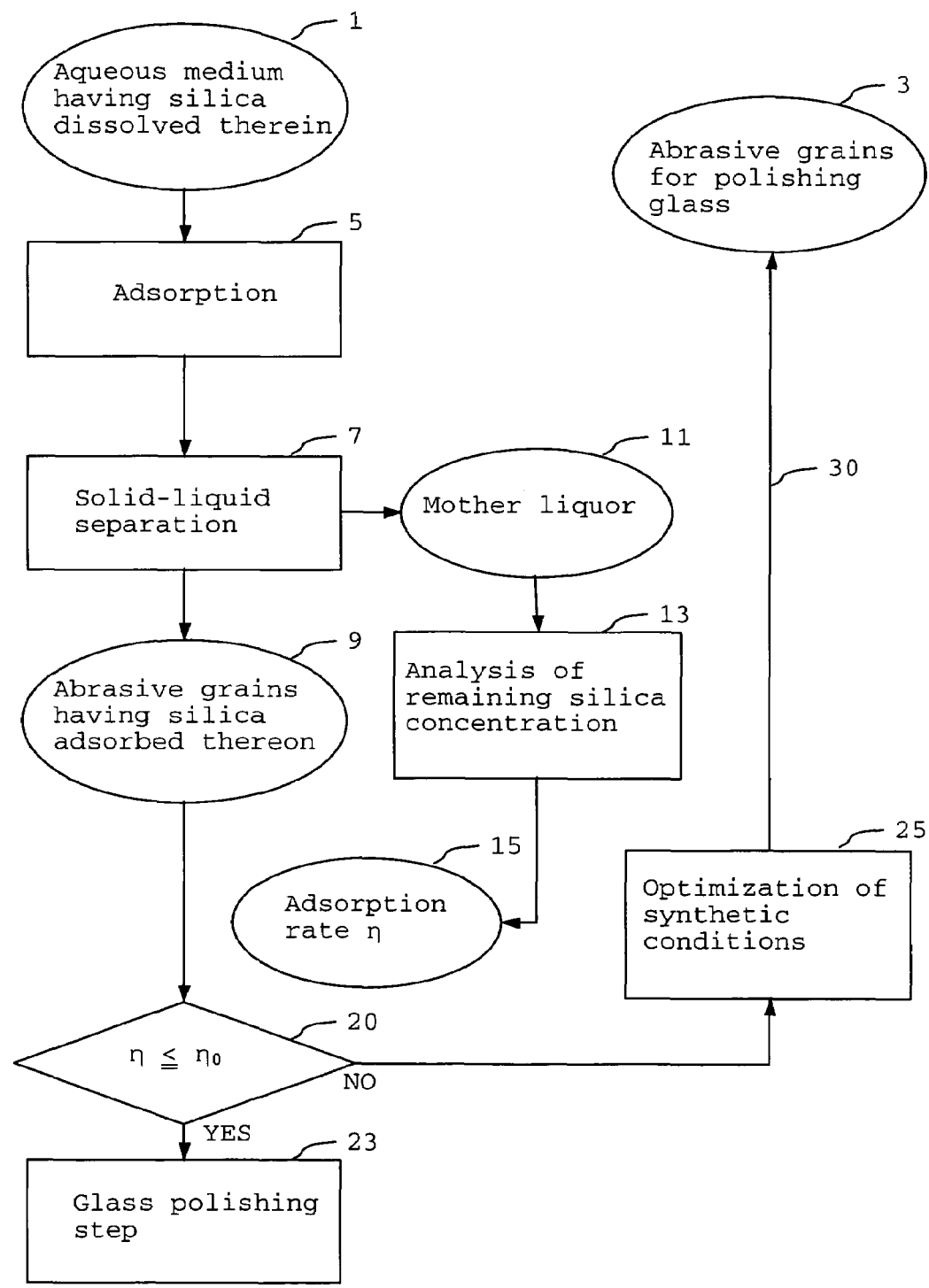
FIG. 1 is a flow chart showing the method for evaluating the polishing quality by an analysis of silica adsorbed on abrasive grains for polishing glass in the present invention.

Now, the present invention will be described in further detail with reference to the drawing.

FIG. 1 is a flow chart showing the method for evaluating the polishing quality by an analysis of silica adsorbed on abrasive grains for polishing glass, and a process of selecting an abrasive of a certain specific quality based on the evaluation method and using it in a glass polishing step.

Namely, in this method for evaluating the quality of the abrasive, firstly, abrasive grains 3 for polishing glass, to be measured, are added to an aqueous medium 1 having silica dissolved therein, to have the silica adsorbed 5 on the abrasive grains under such a condition that the silica undergoes substantially no polymerization in the aqueous medium.

One of the central technical concepts in the present invention resides in that the adsorbed amount on the abrasive particles of silica dissolved in the aqueous medium, is accurately measured to use it for the evaluation of the quality of the abrasive.

Aqueous Medium Having Silica Dissolved Therein

When a glass substrate is polished with an abrasive slurry (usually a slurry of an aqueous medium) comprising, as the main component, a rare earth oxide containing cerium oxide, components of glass (silica as the main component and other glass component elements) will be eluted and dissolved in an aqueous medium (water or an aqueous medium usually comprising water as the main component) as the solvent, during the polishing step. It is considered that such silica will be gradually polymerized and will grow in the aqueous medium from a precursor state of ultrafine particles of silica.

Thus, the concentrations of various ions in the aqueous medium are likely to present an influence over the polymerization rate, and the surface potential of abrasive grains in the liquid is likely to present an influence over the adsorption performance of silica on the abrasive grains, whereby the adsorption behavior of silica in the practical abrasive slurry is complex, and it is not easy to measure it with good reproducibility.

Therefore, in the present invention, a model liquid of dissolved silica having pH 7 which is close to the pH of the abrasive slurry ("dissolved" includes one in the precursor state of formation of ultrafine particles of silica, the same applies hereinafter), is prepared, and the silica adsorption rate in such a liquid, is measured.

Such a model liquid is a neutral liquid having a pH of 7.0, which contains silica in an amount of 100 mg/l as calculated as Si. As will be described in detail hereinafter, this is one prepared by starting with a stock solution having a pH of about 13 wherein silica is completely dissolved, adding an aqueous acid solution to such a stock solution, followed by dilution with deionized water to obtain a test solution having silica dissolved and having a pH of 7.0.

Adsorption Step

Abrasive grains 3 for polishing glass are added to such an aqueous medium having silica dissolved therein (the test solution having silica dissolved therein) to have the dissolved silica adsorbed on the abrasive grains.

The amount of silica adsorbed on the abrasive grains can be calculated by measuring the concentration of silica dissolved in the aqueous medium. Namely, when the initial silica concentration is represented by $C_0$, and the silica concentration upon expiration of time t is represented by $C_t$, as a matter of course, $C_t$ must be basically the same as $C_0$, if no adsorption takes place, and if adsorption takes place, the difference $\Delta C = C_0 - C_t$ corresponds to the amount of silica adsorbed on the abrasive grains.

However, there is a problem such that in parallel with the adsorption step, polymerization of silica proceeds, and the concentration of the dissolved silica decreases also by such polymerization. Accordingly, it is necessary to calculate the adsorbed amount taking into consideration of the amount of such polymerized silica.

Namely, in the test solution having silica dissolved therein, starting from the point where the pH is made neutral, as the starting point, initially, the silica is in a completely dissolved state, but as the time passes, polymerization of silica gradually proceeds. As polymerization of silica proceeds in the test solution, the polymerized and grown silica becomes a filtration residue. Accordingly, by measuring the amount of such a filtration residue, the polymerization speed can be calculated.

From a careful study by the present inventors, it has been found that when the test solution is filtered in its entire amount through a membrane filter having a pore diameter of 0.5 μm, the amount of silica (the amount of polymerized silica) remaining as a filtration residue based on the initial total amount of silica in the test solution, was 0% upon expiration of 0 hour, about 10% upon expiration of two hours, about 20% upon expiration of three hours and about 80% upon expiration of 8 hours, at a liquid temperature of from 20 to 25° C. at room temperature, from the point when the pH is made neutral, and polymerization proceeds over such an elapsed time.

Thus, in the present invention, it has been found that the adsorption rate of silica may be measured by means of such a test solution by selecting an elapsed time zone of about 1.5 hours where polymerization of silica can substantially be negligible, as such a condition that the silica undergoes substantially no polymerization in the aqueous medium. Further, it has been confirmed that in this elapsed time zone, the adsorption rate of silica is already substantially in an equilibrium state.

Thus, by adding abrasive grains 3 to an aqueous medium having silica dissolved therein (the test solution having silica dissolved therein) to carry out a contact/adsorption operation under such a condition that polymerization of the silica can substantially be negligible, followed by solid-liquid separation 7 to separate the abrasive grains 9 having silica adsorbed thereon, and measuring 13 the concentration of silica remaining in the mother liquor 11, it is possible to measure the adsorption rate ($\eta$) 15 of silica on the abrasive grains.

The adsorption operation may be carried out by using a stirring vessel or a reactor, but may preferably be carried out by setting a beaker or a test tube on a shaking machine. For the operation of solid-liquid separation between the abrasive grains and the mother liquor (the filtrate), filtration, centrifugal separation or the like, is usually employed.

Specific Method for Measuring the Silica Adsorption Rate

① A specific method for measuring the silica adsorption rate in the present invention is as follows.

As the aqueous medium, water is usually employed, and as the stock solution having silica dissolved in water, a silicon standard stock solution for atomic adsorption spectrometry (e.g. Si 1000, manufactured by Kanto Chemical Co., Inc., potassium silicate-potassium-hydroxide (0.5 mol/l), pH 13) is employed.

Here, a sodium carbonate type solution or a dilute solution of sodium silicate (water glass) should not be employed, since such may present an influence over the silica adsorption rate, and the apparent adsorption rate tends to have a lower value.

② 20 ml of the above standard stock solution is taken into a beaker, and about 50 ml of deionized water is added thereto, whereupon a 1N hydrochloric acid aqueous solution is added to adjust the pH of the solution to 7. Then, using a measuring flask, the total volume is adjusted to be 100 ml by adding deionized water. At this stage, the Si concentration in the solution is 200 mg/l.

③ Then, a total of 6 ml (Si concentration: 100 mg/l) i.e. 3 ml of the solution having a Si concentration of 200 mg/l and 3 ml of deionized water, was taken into e.g. a polyethylene test tube (with a stopper). At this stage, the Si concentration in the solution is 100 mg/l. This is the test solution having silica dissolved therein.

④ Then, 1.0 g of a dried abrasive grain powder to be measured for the silica adsorption rate, is put into the above test tube, followed by shaking for 1.5 hours by means of a shaking machine.

Here, when 1 g of the abrasive powder is added and mixed to 6 ml of the solution having a Si concentration of 100 mg/l, the pH of the slurry is usually at a level of from 7.0 to 7.5. However, if the pH of the slurry departs from this range, the procedure may be changed so that HCl or KOH is preliminarily added to 3 ml of the above-mentioned deionized water so that the pH of the slurry would be from 7.0 to 7.5, and then 1 g of the abrasive is added. However, as the acid, sulfuric acid should not be employed, since it presents an influence over the silica adsorption rate on the abrasive particles, and the apparent silica adsorption rate tends to be a lower value.

⑤ Then, the solution after the above-mentioned shaking for 1.5 hours, is subjected to centrifugal separation in the test tube at a rotational speed of 3000 rpm for 10 minutes by means of a desk-top centrifugal separator (e.g. H-103N model, manufactured by KOKUSAN). The above operation is all carried out at a liquid temperature (20 to 25° C.) under a room temperature condition.

⑥ 1 ml of the supernatant of the test tube is taken and diluted ten times with deionized water. Then, the solution is subjected to an analysis of the Si concentration in the supernatant by means of a plasma emission spectrometry apparatus (ICP).

Thus, the silica adsorption rate ($\eta$) on the abrasive grains is calculated by the following formula.

$$\text{Silica adsorption rate } (\eta) = ((10 - \text{Si concentration in the supernatant})/10) \times 100 \ (\%)$$

Silica Adsorption Rate $\eta$, $\eta_0$

In the present invention, as shown in the flow chart of FIG. 1, the silica adsorption rate ($\eta$) is measured with respect to the respective abrasive grains by the above-mentioned method, and in the step 20, the measured $\eta$ is compared with $\eta_0$, whereby abrasive grains, for which the measured silica adsorption rate ($\eta$) has at most the specific value ($\eta_0$), are selected or identified, and used for the step 23 of polishing glass.

And, in the present invention, preferably, abrasive grains, for which the silica adsorption rate ($\eta$) is at most 50% (i.e. $\eta_0$=50%), are used for polishing glass.

Further, in a case where the measured abrasive grains have a silica adsorption rate exceeding the specific value ($\eta_0$), the synthetic conditions for the abrasive grains will be optimized at 25, and along line 30 in the flow of FIG. 1, the measurement of the adsorption rate of silica may be repeated until the silica adsorption rate will be at most $\eta_0$.

With abrasive grains, for which the silica adsorption rate ($\eta$) has at most the specific value ($\eta_0$), especially a sufficiently small numerical value where $\eta_0$ is 50%, when such abrasive grains are used for polishing glass, it is possible to sufficiently suppress formation of gelled silica due to polymerization of silica dissolved in the abrasive slurry to lower the polishing rate or to deteriorate the quality of the polished surface.

The silica adsorption rate ($\eta$) of the abrasive is more preferably at most 40%, further preferably at most 30%, still more preferably at most 20%.

It is preferred to reduce the silica adsorption rate while maintaining the surface activities of the abrasive grains, and substantially, its lower limit is at least 1%, more preferably at least 5%.

According to the study of the above method, conducted by the present inventors, with the conventional abrasive fine grains comprising, as the main component, a rare earth oxide containing cerium oxide, for polishing glass, their silica adsorption rate was 58.3%, which is far larger than the abrasive of the present invention, as shown in Comparative Example 1 given hereinafter.

Intended Abrasive Grains

Abrasive grains intended by the present invention are an abrasive to be used for polishing glass, more specifically, abrasive grains for polishing glass comprising, as the main component, a rare earth oxide containing cerium oxide.

And, further preferably, they are an abrasive for polishing glass, containing a fluorine compound, still further preferably an abrasive for polishing glass, having an alkaline earth metal sulfate compound and/or an alkaline earth metal phosphate compound incorporated thereto. Further, as such an alkaline earth metal, calcium or barium is particularly preferably selected, but magnesium and strontium may be used, as will be described hereinafter.

In the present invention, those comprising, as the main component, a rare earth oxide containing cerium oxide and partially having a rare earth fluoride, are referred to "abrasive main component grains" (or simply as "main component grains"), and other subsidiary components comprising an alkaline earth metal sulfate compound and/or an alkaline earth metal phosphate compound are referred to as "abrasive subsidiary component grains" (or simply as "subsidiary component grains").

Abrasive Main Component Grains (1) If the composition of main components in the abrasive main component grains in the present invention is shown by mass % as calculated as oxides, for example, a composition comprising from 50 to 65% of $CeO_2$, from 25 to 35% of $La_2O_3$, from 5 to 6.5% of $Pr_6O_{11}$ and from 0.3 to 15% of $Nd_2O_3$, is preferred.

Further, the content of the fluorine content (F) is preferably from 3 to 9 mass %, more preferably from 5 to 8 mass %. As already mentioned, if the content of the fluorine content (F) is too small, lanthanum oxide having strong basicity can not sufficiently be changed to lanthanum fluoride for fixing, whereby the polishing rate tends to be low. On the other hand, if the fluorine content (F) is too much, the excess rare earth fluoride tends to undergo sintering during firing, such being undesirable.

(2) The average grain diameter ($d_{50}$) of the abrasive main component grains is preferably from 0.3 to 3 μm, more preferably from 0.5 to 2 μm, still further preferably from 0.5 to 1.5 μm. This average grain diameter is measured by a laser scattering method (for example, by means of Microtrac model: 9320-X100, tradename, manufactured by Nikkiso Co., Ltd.).

Further, with respect to the grain diameter distribution of the abrasive grains, when the grain diameters (μm) at 10% and 90% from the small grain diameter in the cumulative grain diameter distribution are represented by $d_{10}$ and $d_{90}$, respectively, $d_{90}/d_{10}$ is preferably at most 15, more preferably at most 10, most preferably at most 5.

(3) With respect to the crystallographic physical properties of abrasive grains, among crystal peaks by the powder X-ray diffraction analysis employing CuKα rays, the maximum peak (A) of cubic system rare earth composite oxide appears in the vicinity of 2θ being 28.3 deg, and a peak (B) of rare earth oxyfluoride appears in the vicinity of 2θ being 26.6 deg, whereby the ratio of the peak heights of such two peaks i.e. B/A, is preferably from 0.2 to 0.8, more preferably from 0.3 to 0.6.

Here, "peak height" represents the height from the base line of the peak curve to the peak apex (the same applies hereinafter).

(4) With respect to the main component grains, other physical properties are as follows.

① The crystallite diameter (by the Scherrer method) is preferably from 150 to 300 Å, more preferably from 170 to 250 Å.

② With respect to the pore structure of the abrasive grains, the specific surface area by the BET method (e.g. as measured by Micro Meritics Flow SorbII 2300, apparatus manufactured by Shimadzu Corporation) is preferably from 1 to 10 m²/g, more preferably from 1.5 to 6 m²/g.

③ Further, the mechanical strength of the abrasive main component grains is measured and calculated, for example, by the following formula by Hiramatsu et al (Hiramatsu, Oka, Kiyama; Journal of Japan Mining Industry Association, 81, 1024 (1965)) as a general formula for the mechanical strength of grains.

$$St=2.8P/(\pi d^2)$$

where St: mechanical strength (MPa) of grains at the time of breakage obtained as a measured value.

P: Compression load (N)

d: Grain diameter (mm)

As is apparent from the above formula, the mechanical strength at the time of breakage of grains substantially varies depending upon the grain diameter and is inversely proportional to the square of the grain diameter, and as the grain diameter becomes small, the grain strength sharply increases.

In the present invention, the mechanical strength of the abrasive main component grains is measured by using this formula by Hiramatsu et al by means of e.g. a microcompression testing machine (MCT-W-500 model), manufactured by Shimadzu Corporation.

In this method, a load is exerted at a constant rate to grains having a grain diameter d, and the mechanical strength is obtained at a point where the change increases sharply, thus showing breakage of the sample grains. In such a manner, measurements are carried out with respect to the grain diameters $d_1, d_2, \ldots, d_n$, respectively, and the average value is obtained. Here, the grain diameter is a value measured by an optical microscope as follows.

Namely, in the present invention, 20 grains having a grain diameter d of from 2 to 3 μm close to the minimum grain diameter measurable by the above-mentioned measuring apparatus, contained in the abrasive, are selected in the field of an optical microscope attached to the test apparatus, and with respect to the respective grains, the mechanical strengths are measured as they are, whereupon the average value is calculated. Here, with respect to the above grain diameter, the abrasive grains in the present invention have grain shapes which are not spherical but irregular, and accordingly, with respect to each of the grains to be measured, the long diameter and the short diameter are respectively measured by a microscopic observation, and the average value of the long diameter and the short diameter is taken as the grain diameter, and only grains having such a diameter of from 2 to 3 μm are selected from the abrasive, and their grain strengths are measured.

As the mechanical strength of the abrasive main component grains of the present invention thus measured, when the unit of pressure is represented by MPa, from 10 to 300 MPa is preferred, from 30 to 200 MPa is more preferred, and from 50 to 200 MPa is further preferred. Most preferred is from 90 to 200 MPa. If the mechanical strength of grains exceeds 300 MPa, the possibility that the polished surface of glass has scratches, will increase. On the other hand, if the grain strength is less than 10 MPa, during the use of the abrasive, the grain diameter distribution may change and tends to depart from the initial preferred range. (Here, the above-mentioned range of mechanical strength of the abrasive grains is one prescribed on the basis of the measured values with respect to grains having a minimum grain diameter of from 2 to 3 μm which are at least contained in the abrasive of the present invention and which can practically be measurable, but, the range of strength based on other optional grain diameter, such as grains having a grain diameter of 1 μm, can be readily calculated by the above-mentioned formula of Hiramatsu et al and can be prescribed.)

It is also one of significant characteristics of the present invention that the range of the mechanical strength of the abrasive grains of the present invention, thus, covers a far wider range than the mechanical strength of conventional abrasive grains.

Abrasive Subsidiary Component Grains

In the present invention, it is preferred that subsidiary component grains are incorporated and coexistent with the main component grains. The subsidiary component grains are ones to be added to basically assist the polishing ability of the main component grains, and as mentioned above, it is preferred that an alkaline earth metal sulfate compound and/or an alkaline earth metal phosphate compound is incorporated to the main component grains, whereby, as mentioned hereinafter, gellation may be suppressed, the silica adsorption rate on the abrasive grains may be lowered more readily, thus providing an effect of further improving the polishing performance of the main component grains. As such an alkaline earth metal, calcium, barium, magnesium or strontium may, for example, be used, and among them, calcium or barium is particularly preferred.

As the specific form of a compound, for example, barium sulfate or calcium secondary phosphate, having an extremely small solubility in water, is preferred, or calcium sulfate or the like which has a solubility in water to some extent, is preferred. In a case where such subsidiary component grains are to be coexistent in a powder state with the main component grains of the abrasive, it is preferred that they are used in the form of barium sulfate ($BaSO_4$), calcium sulfate dihydrate ($CaSO_4.2H_2O$) or calcium secondary phosphate dihydrate ($CaHPO_4.2H_2O$), and incorporated and mixed to the separately prepared main component grains to form an abrasive slurry.

Here, the average grain diameter of the subsidiary component grains such as the above-mentioned barium sulfate ($BaSO_4$), calcium sulfate dihydrate ($CaSO_4.2H_2O$) or calcium secondary phosphate dihydrate ($CaHPO_4.2H_2O$) is preferably from 0.1 to 15 μm, more preferably from 0.3 to 10 μm. Such a grain diameter is measured by using the same instrument as in the case of the main component grains (e.g. Microtrac 9320-X100 model, tradename, manufactured by Nikkiso Co., Ltd.) in the same manner by a laser scattering method.

Abrasive Composition, pH of the Slurry, etc.

In the present invention, the content (the blended amount) of the subsidiary component grains is represented on the basis of the total mass (hereinafter referred to as "the mass of (abrasive) main component grains" where as the mass of "abrasive main component grains" comprising, as the main component, a rare earth oxide containing cerium oxide, the main rare earth compounds (oxides and fluorides) are all calculated as oxides ($CeO_2+La_2O_3+Pr_6O_{11}+Nd_2O_3+Sm_2O_3+Gd_2O_3$, etc.).

As the content of the subsidiary component grains in the abrasive, the amount calculated as anhydrides of the subsidiary component grains is preferably from 0.1 to 5.0 mass %, more preferably from 0.2 to 5.0 mass %, based on the mass of the main component grains. If the content of the subsidiary component grains is less than 0.1 mass %, the action or effect by incorporation of the subsidiary component grains will be small. On the other hand, if the content of the subsidiary component grains exceeds 5.0 mass % too much, the polishing rate level will decrease, such being undesirable.

In the present invention, the abrasive grains (the main component grains of the abrasive alone or in combination with the subsidiary component grains) are used as an aqueous slurry. With respect to the pH of such an aqueous slurry, the pH at room temperature for an aqueous slurry having a solid content concentration of 10 mass % is preferably from 6.0 to 9.0, more preferably from 6.2 to 8.0, most preferably from 6.5 to 7.5.

Further, in order to improve the dispersibility of grains, an organic polymer type dispersant such as a high molecular weight ammonium polycarboxylate or a high molecular weight ammonium polysulfonate may be added to the aqueous medium, in the abrasive slurry in the present invention.

Hardness of Abrasive Grains, etc.

The hardness (Mohs hardness) with respect to the grains (the main component grains or the subsidiary component grains) constituting the abrasive or the glass substrate as a material to be polished, in the present invention, is as follows.

Namely, the glass has a hardness of from 4 to 7, the rare earth abrasive containing cerium oxide has a hardness of from 5.5 to 6.5, and further, barium sulfate has a hardness of from 2.5 to 3.5, calcium sulfate has a hardness of about 2, and calcium secondary phosphate has a hardness of about 1.5. Thus, as is apparent from these numerical values, the Mohs hardnesses of barium sulfate, calcium sulfate and calcium secondary phosphate are, respectively, sufficiently small and soft as compared with the rare earth abrasive containing cerium oxide, and no substantial adverse effects such as scratches on the polished surface of glass due to such subsidiary component grains are considered to be observed. (Here, the numerical values of Mohs hardnesses of the subsidiary component grains such as barium sulfate, etc. are different from cerium oxide, etc., and are numerical values not disclosed even in the most recent edition (the fourth edition published on Jun. 15, 2001) of Kagaku Binran Kiso Hen i.e. a representative handbook in the chemical field.)

Adsorption of Silica and Formation of Gelled Silica

A decrease of the polishing rate caused by formation of gelled silica due to polymerization of dissolved silica, can be effectively suppressed by abrasive grains, of which the silica adsorption rate ($\eta$) measured by the method prescribed in the present invention has at most a specific value ($\eta_0$), such as at most 50%. But, this mechanism has not yet been completely understood. However, the present inventors consider that it may be as follows.

Namely, as mentioned above, silica dissolved from the glass plate to be polished into the abrasive slurry is usually in a precursor state of forming ultrafine grains of silica, and it will be adsorbed and concentrated on the surface of abrasive grains comprising, as the main component, a rare earth oxide containing cerium oxide, by an influence of e.g. the surface potential in water in the vicinity of neutral pH of the rare earth abrasive grains containing cerium oxide. Thus, at the surface of the abrasive grains, the silica concentration is in a state far more concentrated than in the bulk, and as a matter of course, polymerization of silica is accelerated in the region where the silica is highly concentrated. Thus, it is considered that the rare earth abrasive grains having silica adsorbed on the grain surface have a function as nuclear grains to accelerate polymerization of silica.

Namely, the ratio of the outer surface area of grains to the specific surface area of abrasive grains is substantially large, whereby when used for polishing in a slurry state, the abrasive grains having silica adsorbed thereon will be subjected also to such a phenomenon that silica will partially be detached from the outer surface of the adsorbed grains so that the surface of grains will be renewed, as a mechanical action such as friction or collision of grains of abrasive grains to one another will be exerted by the polishing operation. Thus, in the polishing step, at the surface of the abrasive grains, surface renewal of silica-adsorbed grains and further adsorption and polymerization of silica at the renewed grain surface, will be repeated, whereby it is considered that such abrasive grains have such a function as nuclear grains of polymerized silica to accelerate polymerization of silica. Thus, it is considered that with such dissolved silica, formation of gelled silica due to polymerization of silica will be accelerated by the action of the rare earth abrasive grains for adsorption of silica, and such gelled silica presents an undesirable action like an adhesive binder of grains.

In such a manner, at the surface of abrasive grains having a large silica adsorption rate, polymerization of silica will be accelerated, and the rare earth abrasive grains are likely to function as nuclear grains to accelerate polymerization of silica, whereby the maintenance of the polishing rate will be substantially impaired.

Whereas, in the present invention, by selecting abrasive grains, of which the silica adsorption rate ($\eta$) has at most a specific value ($\eta_0$), particularly at most 50%, preferably at most 40%, more preferably at most 30%, still further preferably at most 20%, the amount of adsorption of silica on the abrasive grains can be made sufficiently small and accordingly, the precipitation amount of gelled silica based on the above-mentioned mechanism can be substantially suppressed.

According to a study by the present inventors, by selectively using abrasive grains having the above-mentioned silica adsorption rate of at most 50%, formation of gelled silica can be lowered substantially, and the durability for maintaining the polishing rate can be remarkably improved as compared with usual abrasive grains, of which the silica adsorption rate exceeds 50%. This is apparent from Examples and Comparative Examples given hereinafter.

Supplementary Discussion on the Mechanism of Adsorption of Silica

As mentioned above, a general idea has heretofore been proposed such that in a case where a rare earth oxide containing cerium oxide is used as an abrasive for glass, the silica content in the polished glass will once be dissolved, and thereafter, for example, according to Lee M. Cook, Chemical Processes In Glass Polishing, Journal of Non-Crystalline Solids, North-Holland 120(1990), p. 152–171, a process of adsorption and reprecipitation of silica on the abrasive grain surface will proceed, thus finally leading to gelled silica. However, no sufficient experimental data or evidence is presented.

Further, there has been no substantial confirmation as to how silica dissolved in the abrasive slurry and silica in the polymerization step will specifically be related with the abrasive grains, or to what extent they will have such a relation.

The abrasive grain diameter is at a level of from 0.2 to a few μm, and the dissolved silica is an oligomer at most in a state close to a monomer. However, as polymerization proceeds, from so-called a precursor state of ultrafine grains (grain diameter of about 1 nm) such as active silicic acid, the grain diameter of the ultrafine grains will increase, whereby grain growth will take place three dimensionally. The saturated solubility of silica grains in the ultrafine grain state in water has an extremely large dependency on the grain diameter when the grain diameter is at most 10 nm, and the saturated solubility becomes large as the grain diameter decreases (Ralph K. Iler, The Chemistry of Silica, John Wiley & Sons, 1979 (reprint edition), p. 55). Accordingly, also from the nature of the saturated solubility, gelled silica grains will be precipitated in the abrasive slurry as polymerization of silica proceeds.

Further, it should be mentioned that nothing has been known as to what extent silica dissolved in the abrasive slurry and silica in the polymerization step will be adsorbed on the abrasive grains.

Namely, in the case of an extremely simple system where cerium oxide ($CeO_2$) grains and silica ($SiO_2$) grains are dispersed in water, it is readily conceivable that $SiO_2$ will be adsorbed on $CeO_2$, since the isoelectric point pH corresponding to the pH of the liquid where the surface potential of grains becomes 0, is pH 6.75 in the case of $CeO_2$ and pH 1.8 in the case of $SiO_2$ (G. Parks, Chem. Rev. 65, p. 177–198 (1965), and the surface potentials are mutually different in the vicinity where the pH is neutral.

However, the practical system is not such a simple system. The practical abrasive comprising a rare earth oxide containing cerium oxide for polishing glass is far complex grains, since it is a rare earth oxide mixture containing cerium oxide and is formed of a solid solution, and yet it contains a fluorine content, and besides a rare earth oxyfluoride is also present. It is impossible to predict the behavior of adsorption of dissolved silica on such abrasive grains in a system wherein such abrasive grains are present in an aqueous slurry state.

Further, it has heretofore been difficult to measure the adsorption behavior of such silica itself. As proposed here by the present inventors, by a model test evaluation method close to the actual behavior when silica in the liquid is adsorbed on the abrasive grains at the time of polishing glass by means of the abrasive slurry, it has been made possible for the first time to measure the adsorption rate of such silica.

Action of Alkaline Earth Metal Sulfide Compounds, etc.

In the present invention, an alkaline earth metal sulfide compound and/or an alkaline earth metal phosphate compound being subsidiary component grains to be incorporated to the abrasive main component grains comprising, as the main component, a rare earth oxide containing cerium oxide, has an effect to further improve the polishing performance of the abrasive, as mentioned above. This is considered to be based on the following mechanism.

With respect to barium sulfate grains or calcium secondary phosphate grains which are hardly soluble in water as compared with rare earth abrasive grains, firstly, the silica adsorption rate of such grains themselves is relatively substantially small, and they themselves do not function as nuclear grains to accelerate polymerization of dissolved silica. Accordingly, by incorporating barium sulfate or the like as subsidiary component grains, an effect to lower the silica adsorption rate will be obtained.

Further, it is considered that if barium sulfate grains or calcium secondary phosphate grains are coexistent as grains hardly soluble in the aqueous medium at the glass polished surface together with the main component grains, and contact or collision of the grains to one another is repeated, against the adhesive gelled silica functioning like a binder for grains, the barium sulfate grains or calcium secondary phosphate grains will serve to disintegrate the adhesive gelled silica and will show a function like a filler to impart non-tackiness.

On the other hand, calcium sulfate has a different mechanism, since it has a solubility in water to some extent. It is considered that if such calcium sulfate is incorporated as subsidiary component grains of the abrasive, the calcium sulfate will be dissolved in water in the state of an aqueous slurry of abrasive, and by the presence of calcium sulfate dissolved in water, for some reason, it will function to lower the silica adsorption rate. Further, when the silica adsorption rate is actually measured, a phenomenon is observed wherein the silica adsorption rate decreases substantially. In any case, it is possible to lower the silica adsorption rate by adding dissolved calcium sulfate, and it is accordingly considered that it will suppress polymerization of silica in the abrasive slurry.

As described in the foregoing, by incorporating an alkaline earth metal sulfate compound and/or an alkaline earth metal phosphate compound being subsidiary component grains to the abrasive comprising, as the main component, a rare earth oxide containing cerium oxide, it is possible to more readily bring the measured numerical value of the silica adsorption rate within a range of at most 50% constantly. Namely, it is considered possible to more effectively suppress an adverse effect such as a decrease in the polishing rate or a deterioration in the quality of polished surface due to formation of gelled silica.

Method for Producing Abrasive Grains

The abrasive in the present invention, particularly the abrasive grains, of which the silica adsorption rate is within the range prescribed by the present invention, can be produced by the following method.

Abrasive Main Component Grains

In the present invention, the starting material for the abrasive comprising cerium oxide as the main component, is produced mainly from a rare earth mineral such as bastnaesite, monazite, xenotime or Chinese complex mineral. Among them, commonly employed is a mineral ore such as bastnaesite mineral, monazite mineral or Chinese complex mineral. However, the starting material is not limited thereto.

Firstly, such a rare earth mineral is concentrated to obtain a rare earth mineral concentrate such as bastnaesite mineral concentrate, monazite mineral concentrate or Chinese complex mineral concentrate, and the obtained rare earth mineral concentrate is subjected to chemical treatment to remove unnecessary minerals such as radioactive elements and, if necessary, solvent extraction, followed by a combination of conventional steps such as filtration of precipitates and firing, to obtain a starting material for an abrasive, such as a rare earth carbonate, a rare earth oxide, a rare earth hydroxide or a rare earth fluoride, as the starting material for an abrasive comprising cerium oxide as the main component.

Further, in the case of a rare earth fluoride, it is common to employ a method wherein hydrofluoric acid is added to an aqueous solution of a rare earth chloride to form precipitates of a rare earth fluoride.

(i) Although not limited thereto, an example of the method for producing desirable main component grains for the adhesive in the present invention, is a method wherein a rare earth oxide obtainable by heat decomposition of a rare earth carbonate and a rare earth fluoride are used as the starting materials.

Namely, rare earth carbonate obtainable from the above mineral ore is firstly calcined (preliminary baking) in an oxygen-containing atmosphere at a temperature of from 400 to 840° C. for from 30 minutes to 48 hours, preferably from 1 to 24 hours for thermal decomposition to obtain a rare earth oxide. Thus, it is one of preferred steps to preliminarily calcine the rare earth carbonate at a temperature lower than the firing temperature without directly firing it (main baking). Here, the rare earth carbonate may partially remain in this rare earth oxide.

Here, as a mixture of the rare earth oxide and the rare earth carbonate obtainable by calcining the rare earth carbonate, one having the total rare earth as calculated as oxide (TREO) of from 50 to 97 mass % is preferred, one having a TREO of from 70 to 95 mass % is more preferred, and one having a TREO of from 80 to 93 mass % is further preferred.

On the other hand, with respect to the rare earth fluoride, it is preferred to use one obtained by a common method wherein as mentioned above, hydrofluoric acid is added to an aqueous solution of a rare earth chloride to form precipitates of the rare earth fluoride. However, the rare earth fluoride is not limited thereto.

The calcined rare earth oxide is usually subjected to a step such as addition of a rare earth fluoride, slurrying of the starting material mixture, wet system pulverization, drying, firing, crushing, classification, etc., as will be described hereinafter.

Firstly, a rare earth fluoride is added to the rare earth oxide obtained by calcination as described above. The amount of the rare earth fluoride added is preferably such that the content in the main component grains of the abrasive finally obtainable will be from 3 to 9 mass %, more preferably from 5 to 8 mass %, as calculated as (F) (addition step).

Thus, after adding the rare earth fluoride to the rare earth oxide, water is added, followed by mixing to obtain a slurry having a solid content concentration of from 30 to 60 mass %. This slurry is subjected to wet system pulverization for from about 1 to 10 hours to obtain a slurry composed of grains having a grain diameter of from 0.2 to 10 μm (slurrying of the starting material mixture, and wet system pulverization step).

Then, the wet system pulverized slurry is dried and then fired in an oxygen-containing atmosphere. This firing is one which should be referred to as main baking against the above-mentioned calcination i.e. preliminary baking, and the firing conditions are preferably such that the temperature raising rate at a heating temperature of at least 500° C. is from 0.3 to 5° C./min, and the high temperature to be maintained is from 850 to 1,100° C., and the retention time within such a high temperature range is from 0.5 to 6 hours.

Further, the firing conditions are more preferably such that the temperature raising rate at a heating temperature of at least 500° C. is from 0.5 to 3.5° C./min, the high temperature to be maintained is from 900° C. to 1,000° C., and the retention time within such a high temperature range is from 2 to 5 hours.

The calcination or firing apparatus to carry out the calcination or firing may be a furnace of any type so long as it is capable of accommodating the above-mentioned pulverized and dried starting material, capable of raising the temperature at the temperature raising rate as defined here and capable of maintaining such a high temperature for calcination or firing. For example, a batch system or continuous system box type furnace, rotary furnace or tunnel furnace may be employed. Further, the heating system may be either an electric heating system or a direct heating system (the fuel may be a gas or a fuel oil) (drying, calcination and firing steps).

Thus, after the firing, crushing and, if necessary, classification are carried out to obtain abrasive main component grains having a predetermined grain diameter range (crushing and classification steps).

(ii) Further, it is also possible to employ a method wherein instead of separately preparing and mixing the rare earth oxide and the rare earth fluoride as mentioned above, the rare earth carbonate is used as the starting material, and a part thereof is partially fluorinated with an aqueous hydrofluoric acid solution. In the case of this method, water may be added to the rare earth carbonate to form a slurry, hydrogen fluoride may be added thereto to carry out partial fluorination, and the obtained product may be subjected to steps such as wet pulverization, drying, firing, crushing, classification, etc. in the same manner as prescribed above.

Incorporation of Subsidiary Component Grains

Subsidiary component grains made of an alkaline earth metal sulfate compound and/or an alkaline earth metal phosphate compound, are incorporated to the above described abrasive main component grains and used as an abrasive slurry in a state of a slurry wherein the main component grains and the subsidiary component grains are coexistent.

(i) Here, in order to incorporate and to let the coexisting subsidiary component coexist in the abrasive slurry, various methods may be employed. However, a method which may be most simply and conveniently carried out, is a method wherein firstly an aqueous slurry of abrasive main component grains is prepared, and subsidiary component grains are subsequently added thereto, whereupon the slurry is uniformly mixed to obtain a slurry wherein the main component grains and the subsidiary component grains are coexistent (hereinafter referred to as "the post-addition method").

(In a case where the subsidiary component grains are water soluble, there may be a case where a part or whole of the subsidiary component grains will be an aqueous solution depending upon the amount of such subsidiary component grains incorporated. In the present invention, "co-existence of subsidiary component grains" is used in a sense to include such a state.)

As the apparatus to be used to carry out the post-addition method, any one of solid-liquid mixing apparatus commonly used to carry out an operation for mixing solid-liquid, may suitably be used. For example, a ribbon type stirring vane mixer, a paddle mixer, a mixer of a system where stirring vanes are capable of both autorotation and orbital rotation, a mixer of a gas jet system or a mixer of a rotary cylinder system may be employed, but the apparatus is not limited thereto.

(ii) On the other hand, instead of the post-addition method, it is also possible to employ a method wherein subsidiary component grains are preliminarily incorporated to let them coexist in a step in the course of preparing the abrasive main component grains, and by applying the same production process as the above-mentioned method for producing the abrasive main component grains, the subsidiary component grains may be incorporated to be coexistent with the abrasive main component grains (hereinafter referred to as "the pre-addition method").

The pre-addition method will be described with reference to a case where, for example, a rare earth carbonate containing cerium as the main component, or a rare earth oxide and a rare earth fluoride, are used as the starting material. Prior to or after any one of the above-described steps of addition of a rare earth fluoride, mixing and slurrying the starting material, wet system pulverization, drying, firing, crushing, classification, etc., the subsidiary component grains are added, and the respective steps may be carried out.

In a case where such subsidiary component grains are to be incorporated by the pre-addition method, among barium sulfate ($BaSO_4$), calcium sulfate dihydrate ($CaSO_4.2H_2O$), calcium secondary phosphate dihydrate ($CaHPO_4.2H_2O$), etc. to be added as subsidiary component grains in a usual post-addition method, the dihydrate of e.g. calcium sulfate may be converted to an anhydrous state upon subjected to heat treatment at a high temperature in the firing step, such being not problematic at all.

For example, if calcium sulfate dihydrate or the like is added prior to the wet system pulverization step in the production process, there will be a merit such that a foaming phenomenon can be suppressed substantially completely, or there will be a merit such that the mechanical strength of abrasive grains finally obtainable via the subsequent steps of drying, firing, crushing and classification steps, can be substantially improved. Here, the foaming phenomenon means a phenomenon such that in the step of preparing an abrasive slurry, when subsidiary component grains, etc. are incorporated and mixed, a large amount of foaming will take place, and in an extreme case, the formed foams will likely be overflown from the top of the reactor or mixing container. In an actual operation, once foaming takes place, no further addition of grains can be carried out, whereby a smooth mixing operation may seriously be impaired.

(iii) In a case where the method of employing a rare earth carbonate as the starting material and partially fluorinating a part thereof with an aqueous hydrofluoric acid solution, the respective steps may be carried out by adding the subsidiary component grains prior to or after any one of the steps subsequent to the completion of the partial fluorination with the aqueous hydrofluoric acid solution, i.e. prior to or after any one of wet system pulverization, drying, firing, crushing, classification, etc. subsequent to the partial fluorination by an addition of the aqueous hydrofluoric acid solution to a slurry obtained by adding water to the rare earth carbonate. It is not desirable to carry out the above partial fluorination after adding the subsidiary component grains to the rare earth carbonate, since $CaF_2$, etc. will be formed.

Further, in the above-mentioned either method, even if solid solubilization of the subsidiary component grains into the abrasive main component grains, or the like, takes place in the firing step, the effects of the present invention may not thereby be hindered at all.

(iv) As still another method, it is also possible to employ a method wherein a mixture of the abrasive main component grains and the subsidiary component grains may be subjected to grain complexing by a certain specific complexing apparatus (e.g. a mechanofusion apparatus, manufactured by Hosokawa Micron Corporation), whereby three dimensional circulation and compressing/shearing treatment are repeated at a high speed to have both grains press-bonded and grain-complexed.

Now, the present invention will be described in further detail with reference to Examples. However, it should be understood that these Examples are merely exemplary, and the technical scope of the present invention is by no means thereby restricted.

EXAMPLE 1

Calcined and Fired Main Component Grains are Used Alone

Preparation of Main Component Grains for Abrasive (1) 45 kg of a rare earth carbonate prepared by Kido Kouka Company, China (total rare earth as calculated as oxides (TREO): 42 mass %, $CeO_2$/TREO: 60 mass %) was put into a sleeve container (made of mullite) and calcined (preliminarily baked) in an air atmosphere at a heating temperature of 750° C. for two hours to obtain a rare earth oxide calcined product having a TREO of 90.5 mass %.

(2) Then, 16 kg of the above calcined product and 5.0 kg of a rare earth fluoride prepared by Kanshuku Kido Koutsu Company, China (TREO: 83 mass %, $CeO_2$/TREO: 61 mass %, (F) content: 25 mass %, average grain diameter: 10 μm) were weighed, and both were put into a stirring vessel containing 27.2 kg of water and stirred to obtain a slurry. Then, this slurry was supplied to a wet system pulverizer employing pulverizing medium balls and pulverized in wet system for about 5 hours to a grain diameter of from 0.2 to 6 μm.

(3) The slurry after the wet system pulverization, was put into a vat and dried at 120° C. for 20 hours by a box type drier. The powder after drying was put into a sleeve container (made of mullite) and fired in an air atmosphere. Namely, it was fired under such conditions that the temperature raising rate was 2.3° C./min at a heating temperature of at least 500° C., the high temperature to be maintained was 950° C., and the retention time at that temperature was 3.0 hours. The powder after firing was crushed by a crusher and then classified by means of an air classifier to obtain 14.0 kg of main component grains for abrasive.

Composition and Various Physical Property Values of the Main Component Grains (1) When the composition of the main component grains for abrasive is represented by mass % as calculated as oxides, $CeO_2$ was 61.9%, $La_2O_3$ 31.5%, $Pr_6O_{11}$ 5.3%, $Nd_2O_3$ 0.9%, each of $Sm_2O_3$ and $Gd_2O_3$ less than 0.1%, CaO 0.20%, BaO 0.075%, $P_2O_5$ 0.015%, and the content of a fluorine content (F) 5.7%.

(2) The average grain diameter ($d_{50}$) was 0.95 μm (measured by a laser scattering method by Microtrac, 9320-X100 model, tradename, manufactured by Nikkiso Co., Ltd.).

Further, with respect to the grain diameter distribution, $d_{90}/d_{10}$ was 3.4, where $d_{10}$ and $d_{90}$ are grain diameters (μm) at 10% and 90% from the small grain diameter, in the cumulative grain diameter distribution, respectively.

(3) The results of the X-ray diffraction spectrum analysis of the main component grains by means of a powder X-ray diffraction apparatus (CuKα rays, Rint-2000 model, manufactured by Rigaku K.K.), are as follows.

In the vicinity of 2θ being 28.3 deg, the maximum peak (A) of cubic system rare earth composite oxide appears, and in the vicinity of 2θ being 26.6 deg, a peak (B) of a rare earth oxyfluoride appears. (In the following Examples and Comparative Examples), 2θ at which the two peaks appeared, were substantially the same.)

The peak height ratio (B/A) of the peak height (B) to the peak height (A) was 0.50. Further, in the X-ray diffraction analysis, no crystal peak of cerium fluoride was observed.

(4) Further, other physical properties of the main component grains were as follows.

① The crystallite diameter (Scherrer method) was 205 Å.

② The specific surface area of the grains by the BET method (measured by Micro Meritics Flow SorbII 2300, the name of the apparatus, manufactured by Shimadzu Corporation) was 2.8 $m^2$/g.

③ In the measurement of mechanical strength of grains by means of microcompression tester (MCT-W 500 model, manufactured by Shimadzu Corporation) of the above main component grains (the same applies to the following Examples and Comparative Examples), "the average value of 20 grains having a grain diameter of from 2 to 3 μm" was 55 MPa.

④ Further, the pH of the aqueous slurry (solid content concentration: 10 mass %) of the main component grains was 7.0.

⑤ Further, the measured value of the silica adsorption rate as an important physical value of the main component grains was 28.1%.

Polishing Test

The polishing test was carried out by the following method under the following conditions.

(i) As the polishing testing machine, one side polishing machine 32GPAW model, manufactured by SPEEDFAM Co., Ltd. was employed. The glass plate to be polished, which was used for the test, was one having a small size i.e. non-alkali glass manufactured by Asahi Glass Company, Limited, tradename: AN-100 ($SiO_2$ content in the glass composition: about 60 mass %, size of the test plate (square): 100 mm/100 mm/0.7 mm).

(ii) As the polishing pad, one made of foamed polyurethane was used, and a one side polishing test was carried out under a polishing pressure of 150 g/$cm^2$ at a platen rotational speed of 50 rpm.

(iii) The concentration of the abrasive in the abrasive slurry was 10 mass %. The abrasive slurry to be supplied to the polishing machine was recycled for polishing, whereby the concentration of dissolved glass in the abrasive solution will increase. In the actual industrial scale production plant (practical plant), such a silica concentration in the abrasive slurry will reach to about 1%, which is a considerably dense concentration where polymerization will be problematic. In this polishing test, the amount of the total slurry (the holdup amount) to be used for the test was made to be a small amount of 200 ml, so that also in this test apparatus employing a small glass plate to be polished, a state close to the glass concentration in the abrasive slurry in the practical polishing line will be reached in about a few hours, so that it corresponds to the polishing condition in such a practical polishing machine.

Namely, on the platen of the polishing machine, a shroud to pool the slurry was provided, and the abrasive slurry was supplied thereto from the slurry container at a rate of 70 ml/min by means of a small pump, and the slurry overflown from the slurry pool on the platen of the polishing machine, was returned to the above-mentioned slurry container and used for polishing by recycling.

Further, the polishing test was carried out by controlling the liquid temperature of the abrasive slurry to be supplied to the abrasive machine as recycled by the small pump to be about 40° C. by disposing the recycling liquid piping in a constant temperature tank.

(iv) While carrying out the polishing by the above method, every one hour, the concentration of dissolved glass accumulated in the polishing slurry and the thickness of the polished glass plate, were obtained. Further, the polishing test was carried out while replacing the glass plate sample to be polished by a new sample every one hour of polishing.

Test Results

The test results are shown in Table 1.

In the Table, the concentration of dissolved glass accumulated in the abrasive slurry and the thickness of the polished glass plate, are ones obtained from the difference in mass of the glass plate before and after the polishing.

Further, the surface condition of the glass surface (the polished surface) was evaluated by counting the number of scratches by a naked eye using a halogen lamp of 400,000 lux as a light source, but on the polished surface, no defects such as scratches were observed.

When the results in Table 1 are compared with Comparative Example 1 (shown in Table 13) wherein abrasive grains having a large silica adsorption rate value were used, in each case, the concentration of dissolved glass in the abrasive slurry will increase accumulately as the number of polishing times (polishing time) advances. However, in Example 1 of the present invention, as compared with Comparative Example 1, the decrease in thickness of the polished glass as the time passes (every polishing time) is small. Namely, it has been found that the decrease in the polishing rate is low, and a high polishing performance is maintained over the entire polishing time.

TABLE 1

| Polishing time (hr) | Concentration of dissolved glass in the slurry (mass %) | Thickness of polished glass (μm/hr) |
|---|---|---|
| 1 | 0.135 | 10.83 |
| 2 | 0.285 | 11.98 |
| 3 | 0.426 | 11.25 |
| 4 | 0.566 | 11.25 |
| 5 | 0.706 | 11.20 |
| 6 | 0.838 | 10.54 |
| 7 | 0.963 | 9.98 |
| 8 | 1.085 | 9.80 |

In the following Examples 2 to 12 and Comparative Example 1, in a case where co-existent subsidiary component grains were added to abrasive main component grains, the mixing apparatus, the X-ray diffraction analysis of the abrasive powder, the grain diameter distribution measurement, the apparatus for the polishing test and the method for inspecting the polished glass surface, etc. were basically the same as in Example 1.

EXAMPLE 2

Fired Main Component Grains are Used Alone

Preparation of Main Component Grains for Abrasive (1) 30 kg of tap water was added to 45 kg of a rare earth carbonate prepared by Kido Kouka Company, China (total rare earth as calculated as oxides (TREO): 41 mass %, $CeO_2$/TREO: 60 mass %), followed by pulverization for 5 hours by a wet system ball mill to a grain diameter of from 0.2 to 8 μm.

(2) Then, this slurry was put into a stirring vessel, and with stirring, 2,275 ml of a 55 mass % hydrofluoric acid aqueous solution was gradually dropwise added, and after completion of the dropwise addition, stirring was continued for about 1 hour for reaction to obtain a partially fluorinated slurry.

(3) The slurry was filtered, preliminarily dried and then further pulverized by a dry system pulverizer and fired in an electric furnace of an air atmosphere under such conditions that the temperature raising rate was 1.5° C./min at a heating temperature of at least 500° C., the high temperature to be maintained was 920° C., and the retention time at that temperature was 3.0 hours. After cooling naturally, pulverization and classification were carried out to obtain 13.0 kg of main component grains of abrasive.

Composition of the Main Component Grains and Various Physical Properties (1) When the composition of the main component grains for abrasive is represented by mass % as calculated as oxides, $CeO_2$ was 61.5%, $La_2O_3$ 31.5%, $Pr_6O_{11}$ 6.2%, $Nd_2O_3$ 0.8%, each of $Sm_2O_3$ and $Gd_2O_3$ less than 0.1%, $CaO$ 0.21%, $BaO$ 0.079%, $P_2O_5$ 0.015%, and the content of the fluorine content (F) 5.7%.

(2) The average grain diameter ($d_{50}$) was 0.83 μm (measured by a laser scattering method by Microtrac, 9320-X100 model, tradename, manufactured by Nikkiso Co., Ltd.).

Further, with respect to the grain diameter distribution, $d_{90}/d_{10}$ was 4.2, where $d_{10}$ and $d_{90}$ are grain diameters (μm) at 10% and 90% from the small grain diameter, in the cumulative grain diameter distribution, respectively.

(3) The results of the X-ray diffraction spectrum analysis of the main component grains by means of a powder X-ray diffraction apparatus (CuKα rays, Rint-2000 model, manufactured by Rigaku K.K.), are as follows.

In the vicinity of 2θ being 28.3 deg, the maximum peak (A) of cubic system rare earth composite oxide appears, and in the vicinity of 2θ being 26.6 deg, a peak (B) of a rare earth oxyfluoride appears.

The peak height ratio (B/A) of the peak height (B) to the peak height (A) was 0.53. Further, in the X-ray diffraction analysis, no crystal peak of cerium fluoride was observed.

(4) Further, other physical properties of the main component grains were as follows.

① The crystallite diameter (Scherrer method) was 250 Å.

② The specific surface area of the grains by the BET method (measured by Micro Meritics Flow SorbII 2300, the name of the apparatus, manufactured by Shimadzu Corporation) was 3.7 m²/g.

③ The mechanical strength of the above main component grains (the average value of 20 grains having a grain diameter of from 2 to 3 μm) was 47 MPa.

④ Further, the pH of the aqueous slurry (solid content concentration: 10 mass %) of the main component grains was 7.3.

⑤ Further, the measured value of the silica adsorption rate as an important physical value of the main component grains was 39.4%.

Polishing Test

The polishing test of the abrasive was carried out by the same method under the same conditions and evaluated in the same manner as in Example 1.

The test results are shown in Table 2.

No defects such as scratches were observed on the polished surface. Further, as is evident from the Table, it was found that a high polishing performance was maintained over the entire polishing time.

TABLE 2

| Polishing time (hr) | Concentration of dissolved glass in the slurry (mass %) | Thickness of polished glass (μm/hr) |
| --- | --- | --- |
| 1 | 0.134 | 10.73 |
| 2 | 0.270 | 10.86 |
| 3 | 0.396 | 10.05 |
| 4 | 0.519 | 9.88 |
| 5 | 0.638 | 9.50 |
| 6 | 0.752 | 9.12 |
| 7 | 0.862 | 8.84 |
| 8 | 0.967 | 8.34 |

EXAMPLE 3

Calcined and Fired Main Component Grains+1% of $CaSO_4$+1% of $BaSO_4$ (Post-addition Method)

Preparation of Abrasive Grains (1) To 1 kg of the same main component grains of abrasive having a silica adsorption rate of 28.1% as prepared in Example 1, 12.6 g of calcium sulfate dihydrate ($CaSO_4.2H_2O$, reagent manufactured by Wako Junyaku K.K.) and 10.0 g of barium sulfate ($BaSO_4$, BMH-40, tradename, manufactured by Sakai Chemical Industry Co., Ltd.) were added as the coexistent subsidiary component grains.

This mixture was uniformly mixed by a powder mixer of the type wherein movement of the stirring vanes is of both systems of autorotation and orbital rotation (ACM model, manufactured by Aikousha Seisakusho K.K.) to obtain abrasive grains. The abrasive grains contained 1 mass % of $CaSO_4$ and 1 mass % of $BaSO_4$, as coexistent subsidiary components as calculated as anhydrides, based on the main component grains.

(2) The silica adsorption rate of the abrasive grains was 17.3%, which was a lower numerical value than the silica adsorption rate (28.1%) of the main component grains alone in the abrasive.

Using the abrasive grains, a polishing test was carried out by the same method under the same conditions and evaluated in the same manner as in Example 1. Here, the polishing test was carried out after completely dissolving the calcium sulfate in the abrasive slurry in water in the slurry.

Test Results

The test results are shown in Table 3.

No defects such as scratches were observed on the polished surface. Further, as is evident from the Table, it was found that a high polishing performance was maintained over the entire polishing time.

TABLE 3

| Polishing time (hr) | Concentration of dissolved glass in the slurry (mass %) | Thickness of polished glass (μm/hr) |
| --- | --- | --- |
| 1 | 0.136 | 10.87 |
| 2 | 0.286 | 12.00 |
| 3 | 0.434 | 11.87 |
| 4 | 0.581 | 11.75 |
| 5 | 0.725 | 11.53 |
| 6 | 0.867 | 11.36 |
| 7 | 1.009 | 11.30 |
| 8 | 1.150 | 11.28 |

EXAMPLE 4

Calcined and Fired Main Component Grains+0.5% of $CaSO_4$+1% of $BaSO_4$ (Post-addition Method)

Preparation of Abrasive Grains (1) To 1 kg of the same main component grains of abrasive having a silica adsorption rate of 28.1% as prepared in Example 1, 6.3 g of calcium sulfate dihydrate ($CaSO_4.2H_2O$, reagent manufactured by Wako Junyaku K.K.) and 10.0 g of barium sulfate ($BaSO_4$, BMH-40, tradename, manufactured by Sakai Chemical Industry Co., Ltd.) were added as the coexistent subsidiary component grains.

This mixture was uniformly mixed by a powder mixer of the type wherein movement of the stirring vanes is of both systems of autorotation and orbital rotation (ACM model, manufactured by Aikousha Seisakusho K.K.) to obtain abrasive grains. The abrasive grains contained 0.5 mass % of $CaSO_4$ and 1 mass % of $BaSO_4$, as coexistent subsidiary components as calculated as anhydrides, based on the main component grains.

(2) The silica adsorption rate of the abrasive grains was 23.0%, which was a lower numerical value than the silica adsorption rate (28.1%) of the main component grains alone in the abrasive.

Using the abrasive grains, a polishing test was carried out by the same method under the same conditions and evaluated in the same manner as in Example 1. Here, the polishing test was carried out after completely dissolving the calcium sulfate in the abrasive slurry in water in the slurry.

Test Results

The test results are shown in Table 4.

No defects such as scratches were observed on the polished surface. Further, as is evident from the Table, it was found that a high polishing performance was maintained over the entire polishing time.

TABLE 4

| Polishing time (hr) | Concentration of dissolved glass in the slurry (mass %) | Thickness of polished glass (μm/hr) |
| --- | --- | --- |
| 1 | 0.136 | 10.85 |
| 2 | 0.285 | 11.97 |
| 3 | 0.433 | 11.84 |
| 4 | 0.580 | 11.71 |
| 5 | 0.723 | 11.50 |
| 6 | 0.865 | 11.31 |
| 7 | 1.006 | 11.27 |
| 8 | 1.146 | 11.24 |

EXAMPLE 5

Fired Main Component Grains+1% of $CaSO_4$ (Post-addition Method)

Preparation of Abrasive Grains (1) To 1 kg of the same main component grains of abrasive having a silica adsorption rate of 39.4% as prepared in Example 2, 12.6 g of calcium sulfate dihydrate ($CaSO_4.2H_2O$, reagent manufactured by Wako Junyaku K.K.) was added as the coexistent subsidiary component grains.

This mixture was uniformly mixed by a powder mixer of the type wherein movement of the stirring vanes is of both systems of autorotation and orbital rotation (ACM model, manufactured by Aikousha Seisakusho K.K.) to obtain abrasive grains. The abrasive grains contained 1 mass % of $CaSO_4$, as coexistent subsidiary components as calculated as anhydrides, based on the main component grains.

(2) The silica adsorption rate of the abrasive grains was 25.2%, which was a lower numerical value than the silica adsorption rate (39.4%) of the main component grains alone in the abrasive.

Using the abrasive grains, a polishing test was carried out by the same method under the same conditions and evaluated in the same manner as in Example 1. Here, the polishing test was carried out after completely dissolving the calcium sulfate in the abrasive slurry in water in the slurry.

Test Results

The test results are shown in Table 5.

No defects such as scratches were observed on the polished surface. Further, as is evident from the Table, it was found that a high polishing performance was maintained over the entire polishing time.

TABLE 5

| Polishing time (hr) | Concentration of dissolved glass in the slurry (mass %) | Thickness of polished glass (μm/hr) |
|---|---|---|
| 1 | 0.134 | 10.75 |
| 2 | 0.275 | 11.21 |
| 3 | 0.411 | 10.95 |
| 4 | 0.546 | 10.76 |
| 5 | 0.677 | 10.47 |
| 6 | 0.805 | 10.23 |
| 7 | 0.929 | 9.98 |
| 8 | 1.050 | 9.65 |

EXAMPLE 6

Fired Main Component Grains+1% of $BaSO_4$ (Post-addition Method)

Preparation of Abrasive Grains (1) To 1 kg of the same main component grains of abrasive having a silica adsorption rate of 39.4% as prepared in Example 2, 10.0 g of barium sulfate ($BaSO_4$, BMH-40, tradename, manufactured by Sakai Chemical Industry Co., Ltd.) was added as the coexistent subsidiary component grains.

This mixture was uniformly mixed by a powder mixer of the type wherein movement of the stirring vanes is of both systems of autorotation and orbital rotation (ACM model, manufactured by Aikousha Seisakusho K.K.) to obtain abrasive grains. The abrasive grains contained 1 mass % of $BaSO_4$, as coexistent subsidiary components as calculated as anhydrides, based on the main component grains.

(2) The silica adsorption rate of the abrasive grains was 36.2%, which was a lower numerical value than the silica adsorption rate (39.4%) of the main component grains alone in the abrasive.

Using the abrasive grains, a polishing test was carried out by the same method under the same conditions and evaluated in the same manner as in Example 1.

Test Results

The test results are shown in Table 6.

No defects such as scratches were observed on the polished surface. Further, as is evident from the Table, it was found that a high polishing performance was maintained over the entire polishing time.

TABLE 6

| Polishing time (hr) | Concentration of dissolved glass in the slurry (mass %) | Thickness of polished glass (μm/hr) |
|---|---|---|
| 1 | 0.134 | 10.73 |
| 2 | 0.272 | 10.99 |
| 3 | 0.409 | 10.97 |
| 4 | 0.541 | 10.57 |
| 5 | 0.669 | 10.24 |
| 6 | 0.794 | 10.01 |
| 7 | 0.917 | 9.87 |
| 8 | 1.036 | 9.51 |

EXAMPLE 7

Fired Main Component Grains+4.5% of $CaHPO_4$ (Post-addition Method)

Preparation of Abrasive Grains (1) To 1 kg of the same main component grains of abrasive having a silica adsorption rate of 39.4% as prepared in Example 2, 56.9 g of calcium secondary phosphate dihydrate ($CaHPO_4.2H_2O$, manufactured by Hokusei K.K., average grain diameter: 3.3 μm) was added as the coexistent subsidiary component grains.

This mixture was uniformly mixed by a powder mixer of the type wherein movement of the stirring vanes is of both systems of autorotation and orbital rotation (ACM model, manufactured by Aikousha Seisakusho K.K.) to obtain abrasive grains. The abrasive grains contained 4.5 mass % of $CaHPO_4$, as coexistent subsidiary components as calculated as anhydrides, based on the main component grains.

(2) The silica adsorption rate of the abrasive grains was 30.1%, which was a lower numerical value than the silica adsorption rate (39.4%) of the main component grains alone in the abrasive.

Using the abrasive grains, a polishing test was carried out by the same method under the same conditions and evaluated in the same manner as in Example 1.

Test Results

The test results are shown in Table 7.

No defects such as scratches were observed on the polished surface. Further, as is evident from the Table, it was found that a high polishing performance was maintained over the entire polishing time.

TABLE 7

| Polishing time (hr) | Concentration of dissolved glass in the slurry (mass %) | Thickness of polished glass (μm/hr) |
|---|---|---|
| 1 | 0.135 | 10.76 |
| 2 | 0.272 | 11.02 |
| 3 | 0.410 | 10.99 |
| 4 | 0.542 | 10.60 |
| 5 | 0.672 | 10.35 |
| 6 | 0.798 | 10.11 |
| 7 | 0.923 | 9.97 |
| 8 | 1.043 | 9.63 |

EXAMPLE 8

Fired Main Component Grains+1.5% of
CaSO$_4$+1% of BaSO$_4$ (Post-addition Method)

Preparation of Abrasive Grains (1) To 1 kg of the same main component grains of abrasive having a silica adsorption rate of 39.4% as prepared in Example 2, 18.9 g of calcium sulfate dihydrate (CaSO$_4$.2H$_2$O, reagent manufactured by Wako Junyaku K.K.) and 10.0 g of barium sulfate (BaSO$_4$, BMH-40, tradename, manufactured by Sakai Chemical Industry Co., Ltd.) were added as the coexistent subsidiary component grains.

This mixture was uniformly mixed by a powder mixer of the type wherein movement of the stirring vanes is of both systems of autorotation and orbital rotation (ACM model, manufactured by Aikousha Seisakusho K.K.) to obtain abrasive grains. The abrasive grains contained 1.5 mass % of CaSO$_4$ and 1 mass % of BaSO$_4$, as coexistent subsidiary components as calculated as anhydrides, based on the main component grains.

(2) The silica adsorption rate of the abrasive grains was 27.1%, which was a lower numerical value than the silica adsorption rate (28.1%) of the main component grains alone in the abrasive.

Using the abrasive grains, a polishing test was carried out by the same method under the same conditions and evaluated in the same manner as in Example 1. Here, the polishing test was carried out after completely dissolving the calcium sulfate in the abrasive slurry in water in the slurry.

Test Results

The test results are shown in Table 8.

No defects such as scratches were observed on the polished surface. Further, as is evident from the Table, it was found that a high polishing performance was maintained over the entire polishing time.

TABLE 8

| Polishing time (hr) | Concentration of dissolved glass in the slurry (mass %) | Thickness of polished glass (μm/hr) |
|---|---|---|
| 1 | 0.137 | 10.97 |
| 2 | 0.287 | 12.00 |
| 3 | 0.437 | 11.98 |
| 4 | 0.585 | 11.87 |
| 5 | 0.729 | 11.48 |
| 6 | 0.868 | 11.12 |
| 7 | 1.002 | 10.75 |
| 8 | 1.127 | 10.00 |

EXAMPLE 9

Calcined and Fired Main Component Grains+0.5%
of CaSO$_4$ (Pre-addition Method)

Preparation of Abrasive Grains (1) 45 kg of a rare earth carbonate prepared by Kido Kouka Company, China (total rare earth as calculated as oxides (TREO): 42 mass %, CeO$_2$/TREO: 60 mass %) was put into a sleeve container (made of mullite) and calcined (preliminarily baked) in an air atmosphere at a heating temperature of 750° C. for two hours to obtain a rare earth oxide calcined product having a TREO of 90.5 mass % and an ignition loss (at 1,000° C. for 2 hrs) of 8.05 mass %.

(2) Then, 16 kg of the above calcined product and 5.0 kg of rare earth fluoride prepared by Kanshuku Kido Koutsu Company, China (TREO: 83 mass %, CeO$_2$/TREO: 61 mass %, (F) content: 25 mass %, average grain diameter: 10 μm) and 125 g of calcium sulfate dihydrate (CaSO$_4$.2H$_2$O, reagent manufactured by Wako Junyaku K.K.) were weighed, and these powders were put into a stirring vessel containing 27.2 kg of water and stirred to obtain a slurry. Then, this slurry was supplied to a wet system pulverizer employing pulverizing medium balls and pulverized in a wet system for about 5 hours to a grain diameter of from 0.2 to 6 μm.

(3) The slurry after the wet system pulverization, was put into a vat and dried at 120° C. for 20 hours by a box type drier. The powder after drying was put into a sleeve container (made of mullite) and fired in an air atmosphere. Namely, it was fired under such conditions that the temperature raising rate of 2.3° C./min at a heating temperature of at least 500° C., the high temperature to be maintained was 950° C., and the retention time at that temperature was 3.0 hours. The powder after firing was crushed by a crusher and then classified by means of an air classifier to obtain 14.0 kg of main component grains for abrasive.

Composition and Various Physical Property Values of the Main Component Grains (1) When the composition of the main component grains for abrasive is represented by mass % as calculated as oxides, CeO$_2$ was 61.9%, La$_2$O$_3$ 31.5%, Pr$_6$O$_{11}$ 5.3%, Nd$_2$O$_3$ 0.9%, each of Sm$_2$O$_3$ and Gd$_2$O$_3$ less than 0.1%, CaO 0.20%, BaO 0.075%, P$_2$O$_5$ 0.015%, and the content of a fluorine content (F) 6.1%.

(2) The average grain diameter (d$_{50}$) was 0.98 μm (measured by a laser scattering method by Microtrac, 9320-X100 model, tradename, manufactured by Nikkiso Co., Ltd.).

Further, with respect to the grain diameter distribution, d$_{90}$/d$_{10}$ was 3.4, where d$_{10}$ and d$_{90}$ are grain diameters (μm) at 10% and 90% from the small grain diameter, in the cumulative grain diameter distribution, respectively.

(3) The results of the X-ray diffraction spectrum analysis of the main component grains by means of a powder X-ray diffraction apparatus (CuKα rays, Rint-2000 model, manufactured by Rigaku K.K.), are as follows.

In the vicinity of 2θ being 28.3 deg, the maximum peak (A) of cubic system rare earth composite oxide appears, and in the vicinity of 2θ being 26.6 deg, a peak (B) of a rare earth oxyfluoride appears.

The peak height ratio (B/A) of the peak height (B) to the peak height (A) was 0.49. Further, in the X-ray diffraction analysis, no crystal peak of cerium fluoride was observed.

(4) Further, other physical properties of the main component grains were as follows.

① The crystallite diameter (Scherrer method) was 215 Å.

② The specific surface area of the grains by the BET method (measured by Micro Meritics Flow SorbII 2300, the name of the apparatus, manufactured by Shimadzu Corporation) was 2.6 m$^2$/g.

③ The mechanical strength of the main component grains (the average value of 20 grains having a grain diameter of from 2 to 3 μm) was 101 MPa.

④ Further, the pH of the aqueous slurry (solid content concentration: 10 mass %) of the main component grains was 7.2.

⑤ Further, the measured value of the silica adsorption rate as an important physical value of the main component grains was 25.2%.

Test Results

A polishing test of the abrasive was carried out by the same method under the same condition and evaluated in the same manner as in Example 1. Here, the polishing test was carried out after completely dissolving calcium sulfate in the abrasive slurry in water in the slurry.

The test results are shown in Table 9.

No defects such as scratches were observed on the polished surface. Further, as is evident from the Table, it was found that a high polishing performance was maintained.

In this Example 9, the subsidiary component grains were incorporated by "the pre-addition method", and to the calcined product of a rare earth carbonate, rare earth fluoride and calcium sulfate as subsidiary component grains, were added and thoroughly mixed and wet-pulverized in an aqueous slurry state, followed by drying and then by firing to obtain the main component grains containing the subsidiary component grains. (Whereas, in Examples 3, 4, etc., incorporation was carried out by "the post-addition method", and firstly, an rare earth carbonate or the like is calcined and fired to obtain the main component grains of abrasive, and the subsidiary component grains are added thereto for powder mixing (slurry mixing).)

As mentioned above, by such "pre-addition method", the mechanical strength of the final abrasive product (the main component grains+the subsidiary component grains) was substantially improved over the one obtained by the "post-addition method". Further, it was confirmed that the foaming phenomenon was completely suppressed when the abrasive grains were subjected to wet system pulverization, and it was ascertained that there is a merit such that in the practical operation, the handling can be remarkably improved.

TABLE 9

| Polishing time (hr) | Concentration of dissolved glass in the slurry (mass %) | Thickness of polished glass (μm/hr) |
|---|---|---|
| 1 | 0.136 | 10.89 |
| 2 | 0.286 | 12.00 |
| 3 | 0.436 | 11.95 |
| 4 | 0.584 | 11.87 |
| 5 | 0.730 | 11.66 |
| 6 | 0.874 | 11.52 |
| 7 | 1.017 | 11.46 |
| 8 | 1.160 | 11.41 |

EXAMPLE 10

Calcined and Fired Main Component Grains+0.5% of $CaSO_4$ (Pre-addition Method)

Preparation of Abrasive Grains (1) 45 kg of a rare earth carbonate prepared by Kido Kouka Company, China (product having a different lot No. from the one used in Example 9, total rare earth as calculated as oxides (TREO): 44 mass %, $CeO_2$/TREO: 62.5 mass %) was put into a sleeve container (made of mullite) and calcined (preliminarily baked) in an air atmosphere at a heating temperature of 780° C. for two hours to obtain a rare earth oxide calcined product having a TREO of 93.3 mass % and an ignition loss (at 1,000° C. for 2 hrs) of 5.55 mass %.

(2) Then, 15.5 kg of the above calcined product and 5.0 kg of a rare earth fluoride prepared by Kanshuku Kido Koutsu Company, China (TREO: 83 mass %, $CeO_2$/TREO: 61 mass %, (F) content: 25 mass %, average grain diameter: 10 μm) and 125 g of calcium sulfate dihydrate ($CaSO_4.2H_2O$, reagent manufactured by Wako Junyaku K.K.) were weighed, and these powders were put into a stirring vessel containing 27.2 kg of water and stirred to obtain a slurry. Then, this slurry was supplied to a wet system pulverizer employing pulverizing medium balls and pulverized in wet system for about 5 hours to a grain diameter of from 0.2 to 6 μm.

(3) The slurry after the wet system pulverization, was put into a vat and dried at 120° C. for 20 hours by a box type drier. The powder after drying was put into a sleeve container (made of mullite) and fired in an air atmosphere. Namely, it was fired under such conditions that the temperature raising rate was 2.0° C./min at a heating temperature of at least 500° C., the high temperature to be maintained was 950° C., and the retention time at the temperature was 3.0 hours. The powder after firing was crushed by a crusher and then classified by means of an air classifier to obtain 12.8 kg of main component grains for abrasive.

Composition and Various Physical Property Values of the Main Component Grains (1) When the composition of the main component grains for abrasive is represented by mass % as calculated as oxides, $CeO_2$ was 62.5%, $La_2O_3$ 29.8%, $Pr_6O_{11}$ 6.0%, $Nd_2O_3$ 0.2%, each of $Sm_2O_3$ and $Gd_2O_3$ less than 0.1%, $CaO$ 0.10%, $BaO$ 0.03%, $P_2O_5$ 0.01%, and the content of a fluorine content (F) 6.0%.

(2) The average grain diameter ($d_{50}$) was 0.95 μm (measured by a laser scattering method by Microtrac, 9320-X100 model, tradename, manufactured by Nikkiso Co., Ltd.).

Further, with respect to the grain diameter distribution, $d_{90}/d_{10}$ was 4.4, where $d_{10}$ and $d_{90}$ are grain diameters (μm) at 10% and 90% from the small grain diameter, in the cumulative grain diameter distribution, respectively.

(3) The results of the X-ray diffraction spectrum analysis of the main component grains by means of a powder X-ray diffraction apparatus (CuKα rays, Rint-2000 model, manufactured by Rigaku K.K.), are as follows.

In the vicinity of 2θ being 28.3 deg, the maximum peak (A) of cubic system rare earth composite oxide appears, and in the vicinity of 2θ being 26.6 deg, a peak (B) of a rare earth oxyfluoride appears.

The peak height ratio (B/A) of the peak height (B) to the peak height (A) was 0.48. Further, in the X-ray diffraction analysis, no crystal peak of cerium fluoride was observed.

(4) Further, other physical properties of the main component grains were as follows.

① The crystallite diameter (Scherrer method) was 205 Å.

② The specific surface area of the grains by the BET method (measured by Micro Meritics Flow SorbII 2300, the name of the apparatus, manufactured by Shimadzu Corporation) was 2.9 $m^2/g$.

③ The mechanical strength of the main component grains (the average value of 20 grains having a grain diameter of from 2 to 3 μm) was 148 MPa.

④ Further, the pH of the aqueous slurry (solid content concentration: 10 mass %) of the main component grains was 7.4.

⑤ Further, the measured value of the silica adsorption rate as an important physical value of the main component grains was 40.2%.

Test Results

A polishing test of the abrasive was carried out by the same method under the same condition and evaluated in the same manner as in Example 1. Here, the polishing test was carried out after completely dissolving calcium sulfate in the abrasive slurry in water in the slurry.

The test results are shown in Table 10.

No defects such as scratches were observed on the polished surface. Further, as is evident from the Table, it was found that a high polishing performance was maintained.

Like in Example 9, in this Example 10, the subsidiary component grains were incorporated by "the pre-addition method", and to the calcined product of a rare earth carbonate, a rare earth fluoride and calcium sulfate as subsidiary component grains, were added and thoroughly mixed and wet-pulverized in an aqueous slurry state, followed by drying and then by firing to obtain the main component grains containing the subsidiary component grains.

As mentioned above, by such "pre-addition method", the mechanical strength of the final abrasive product (the main component grains+the subsidiary component grains) was substantially improved over the one obtained by the "post-addition method". Further, it was confirmed that the foaming phenomenon was completely suppressed when the abrasive grains were subjected to wet system pulverization.

TABLE 10

| Polishing time (hr) | Concentration of dissolved glass in the slurry (mass %) | Thickness of polished glass (μm/hr) |
|---|---|---|
| 1 | 0.136 | 10.90 |
| 2 | 0.287 | 12.02 |
| 3 | 0.437 | 12.00 |
| 4 | 0.586 | 11.95 |
| 5 | 0.735 | 11.90 |
| 6 | 0.883 | 11.86 |
| 7 | 1.030 | 11.75 |
| 8 | 1.176 | 11.73 |

EXAMPLE 11

Calcined and Fired Main Component Grains+0.5% of $CaSO_4$ (Pre-addition Method)

Preparation of Abrasive Grains (1) 45 kg of a rare earth carbonate prepared by Kido Kouka Company, China (product having a different lot No. from the one used in Example 9 or 10, total rare earth as calculated as oxides (TREO): 45 mass %, $CeO_2$/TREO: 61.0 mass %) was put into a sleeve container (made of mullite) and calcined (preliminarily baked) in an air atmosphere at a heating temperature of 800° C. for two hours to obtain a rare earth oxide calcined product having a TREO of 94.4 mass % and an ignition loss (at 1,000° C. for 2 hrs) of 4.53 mass %.

(2) Then, 15.3 kg of the above calcined product and 5.0 kg of a rare earth fluoride prepared by Kanshuku Kido Koutsu Company, China (TREO: 83 mass %, $CeO_2$/TREO: 61 mass %, (F) content: 25 mass %, average grain diameter: 10 μm) and 125 g of calcium sulfate dihydrate ($CaSO_4 \cdot 2H_2O$, reagent manufactured by Wako Junyaku K.K.) were weighed, and these powders were put into a stirring vessel containing 27.2 kg of water and stirred to obtain a slurry. Then, this slurry was supplied to a wet system pulverizer employing pulverizing medium balls and pulverized in a wet system for about 5 hours to a grain diameter of from 0.2 to 6 μm.

(3) The slurry after the wet system pulverization, was put into a vat and dried at 120° C. for 20 hours by a box type drier. The powder after drying was put into a sleeve container (made of mullite) and fired in an air atmosphere. Namely, it was fired under such conditions that the temperature raising rate was 1.7° C./min at a heating temperature of at least 500° C., the high temperature to be maintained was 950° C., and the retention time at that temperature was 3.0 hours. The powder after firing was crushed by a crusher and then classified by means of an air classifier to obtain 12.5 kg of main component grains for abrasive.

Composition and Various Physical Property Values of the Main Component Grains (1) When the composition of the main component grains for abrasive is represented by mass % as calculated as oxides, $CeO_2$ was 61.0%, $La_2O_3$ 31.4%, $Pr_6O_{11}$ 6.1%, $Nd_2O_3$ 0.2%, each of $Sm_2O_3$ and $Gd_2O_3$ less than 0.1%, $CaO$ 0.10%, $BaO$ 0.03%, $P_2O_5$ 0.01%, and the content of a fluorine content (F) 6.1%.

(2) The average grain diameter ($d_{50}$) was 0.97 μm (measured by a laser scattering method by Microtrac, 9320-X100 model, tradename, manufactured by Nikkiso Co., Ltd.).

Further, with respect to the grain diameter distribution, $d_{90}/d_{10}$ was 4.3, where $d_{10}$ and $d_{90}$ are grain diameters (μm) at 10% and 90% from the small grain diameter, in the cumulative grain diameter distribution, respectively.

(3) The results of the X-ray diffraction spectrum analysis of the main component grains by means of a powder X-ray diffraction apparatus (CuKα rays, Rint-2000 model, manufactured by Rigaku K.K.), are as follows.

In the vicinity of 2θ being 28.3 deg, the maximum peak (A) of cubic system rare earth composite oxide appears, and in the vicinity of 2θ being 26.6 deg, a peak (B) of a rare earth oxyfluoride appears.

The peak height ratio (B/A) of the peak height (B) to the peak height (A) was 0.51. Further, in the X-ray diffraction analysis, no crystal peak of cerium fluoride was observed.

(4) Further, other physical properties of the main component grains were as follows.

① The crystallite diameter (Scherrer method) was 203 Å.

② The specific surface area of the grains by the BET method (measured by Micro Meritics Flow SorbII 2300, the name of the apparatus, manufactured by Shimadzu Corporation) was 2.8 $m^2/g$.

③ The mechanical strength of the main component grains (the average value of 20 grains having a grain diameter of from 2 to 3 μm) was 177 MPa.

④ Further, the pH of the aqueous slurry (solid content concentration: 10 mass %) of the main component grains was 7.5.

⑤ Further, the measured value of the silica adsorption rate as an important physical value of the main component grains was 49.8%.

Test Results

A polishing test of the abrasive was carried out by the same method under the same condition and evaluated in the same manner as in Example 1. Here, the polishing test was carried out after completely dissolving calcium sulfate in the abrasive slurry in water in the slurry.

The test results are shown in Table 11.

No defects such as scratches were observed on the polished surface. Further, as is evident from the Table, it was found that a high polishing performance was maintained.

Like in Example 9, in this Example 11, the subsidiary component grains were incorporated by "the pre-addition method", and to the calcined product of a rare earth carbonate, a rare earth fluoride and calcium sulfate as subsidiary component grains, were added and thoroughly mixed and wet-pulverized in an aqueous slurry state, followed by drying and then by firing to obtain the main component grains containing the subsidiary component grains.

As mentioned above, by such "pre-addition method", the mechanical strength of the final abrasive product (the main component grains+the subsidiary component grains) was substantially improved over the one obtained by the "post-addition method". Further, it was confirmed that the foaming phenomenon was completely suppressed when the abrasive grains were subjected to wet system pulverization.

TABLE 11

| Polishing time (hr) | Concentration of dissolved glass in the slurry (mass %) | Thickness of polished glass (μm/hr) |
|---|---|---|
| 1 | 0.136 | 10.85 |
| 2 | 0.285 | 11.98 |
| 3 | 0.435 | 11.94 |
| 4 | 0.583 | 11.89 |
| 5 | 0.730 | 11.73 |
| 6 | 0.876 | 11.68 |
| 7 | 1.019 | 11.43 |
| 8 | 1.161 | 11.39 |

EXAMPLE 12

Calcined and Fired Main Component Grains+0.5% of $CaSO_4$+1% of $BaSO_4$ (Post-addition Method)

Preparation of Abrasive Grains (1) Using the same abrasive grains as in Example 4, another polishing evaluation method was carried out by changing the polishing test conditions. Namely, an abrasive having a silica adsorption rate of 23.0% wherein as the coexistent subsidiary components as calculated as anhydrides, 0.5 mass % of $CaSO_4$ and 1 mass % of $BaSO_4$ were incorporated to the mass of the main component grains of abrasive, was employed.

Polishing Test

The test was carried out under the following conditions which are different from the polishing conditions in Example 1.

(i) As the polishing testing machine, the same one side polishing machine 32GPAW model, manufactured by SPEEDFAM co., Ltd., as in Example 1 was employed. The glass plate to be polished, which was used for the test, was one having a small size i.e. the same non-alkali glass manufactured by Asahi Glass Company, Limited, tradename: AN-100 (size of the test plate (square): 100 mm/100 mm/0.7 mm) as in Example 1.

(ii) The polishing pad used, was the same foamed polyurethane pad as in Example 1, and the one side polishing test was carried out under a polishing pressure of 150 g/cm² at a platen rotational speed of 50 rpm.

(iii) The concentration of the abrasive in the abrasive slurry was 25 mass %. Namely, with respect to the abrasive slurry to be supplied to the polishing machine, the total amount of the slurry to be used in the test was made to be a small amount of 200 ml in the same manner as in Example 1 so that the concentration of dissolved glass in the abrasive solution, which increases by polishing, is made to be large as the practical machine in a short time.

As the actual operation, on the platen of the polishing machine, a shroud to pool the slurry was provided, and the abrasive slurry was supplied thereto from the slurry container at a rate of 70 ml/min by means of a small pump, and the slurry overflown from the slurry pool on the platen of the polishing machine, was returned to the above-mentioned slurry container and used for polishing by recycling.

Further, the polishing test was carried out by controlling the liquid temperature of the abrasive slurry to be supplied to the abrasive machine as recycled by the small pump to be about 40° C. by disposing the recycling liquid piping in a constant temperature tank.

(iv) While carrying out the polishing by the above method, every 2 hours, the concentration of dissolved glass accumulated in the polishing slurry and the thickness of the polished glass plate, were obtained. Further, the polishing test was carried out while replacing the glass plate sample to be polished by a new sample every 1 hour of polishing.

Test Results

The test results are shown in Table 12.

No defects such as scratches were observed on the polished surface. Further, as is evident from the Table, it was found that a high polishing performance was maintained over the entire polishing time.

TABLE 12

| Polishing time (hr) | Concentration of dissolved glass in the slurry (mass %) | Thickness of polished glass (μm/hr) |
|---|---|---|
| 2 | 0.293 | 23.47 |
| 4 | 0.628 | 26.73 |
| 6 | 0.937 | 24.73 |
| 8 | 1.229 | 23.36 |
| 10 | 1.520 | 23.28 |
| 12 | 1.806 | 22.91 |
| 14 | 2.091 | 22.78 |
| 16 | 2.375 | 22.75 |

COMPARATIVE EXAMPLE 1

Preparation of Main Component Grains for Abrasive (1) 45 kg of a rare earth carbonate prepared by Kido Kouka Company, China (TREO: 41 mass %, $CeO_2$/TREO: 60 mass %) and 5.8 kg of a rare earth fluoride prepared by Kanshuku Kido Koutsu Company, China (TREO: 83 mass %, $CeO_2$/TREO: 61 mass %, F content: 25 mass %, average grain diameter: 10 μm) were weighed and mixed by a powder mixer of the type wherein the motion of stirring vanes is of both systems of autorotation and orbital rotation (ACM model, manufactured by Aikousha Seisakusho K.K.). Then, the powder after mixing and 50.8 kg of water were put into a stirring vessel and stirred to obtain a slurry.

(2) Then, the slurry was supplied by recycling to a wet system pulverizer employing pulverizing medium balls and wet-pulverized for about 5 hours to a grain diameter of from 0.2 to 6 μm.

(3) The slurry after the wet system pulverization, was put into a vat and dried at 120° C. for 20 hours by a box type drier. The powder after drying was put into a sleeve container (made of mullite) and fired in an air atmosphere. Namely, it was fired under such conditions that the temperature raising rate was 1.0° C./min at a heating temperature of at least 500° C., the high temperature to be maintained was 900° C., and the retention time at that temperature was 3.0 hours. The powder after firing was crushed by a crusher and then classified by means of an air classifier to obtain 15.6 kg of main component grains for abrasive.

Composition and Various Physical Property Values of the Main Component Grains (1) When the composition of the main component grains for abrasive is represented by mass % as calculated as oxides, $CeO_2$ was 62.0%, $La_2O_3$ 31.6%, $Pr_6O_{11}$ 5.5%, $Nd_2O_3$ 0.9%, each of $Sm_2O_3$ and $Gd_2O_3$ less than 0.1%, CaO 0.22%, BaO 0.077%, $P_2O_5$ 0.016%, and the content of a fluorine content (F) 4.6%.

(2) The average grain diameter ($d_{50}$) was 0.86 μm (measured by a laser scattering method by Microtrac, 9320-X100 model, tradename, manufactured by Nikkiso Co., Ltd.).

Further, with respect to the grain diameter distribution, $d_{90}/d_{10}$ was 5.3, where $d_{10}$ and $d_{90}$ are grain diameters (μm) at 10% and 90% from the small grain diameter, in the cumulative grain diameter distribution, respectively.

(3) The results of the X-ray diffraction spectrum analysis of the main component grains by means of a powder X-ray diffraction apparatus (CuKα rays, Rint-2000 model, manufactured by Rigaku K.K.), are as follows.

In the vicinity of 2θ being 28.3 deg, the maximum peak (A) of cubic system rare earth composite oxide appears, and in the vicinity of 2θ being 26.6 deg, a peak (B) of a rare earth oxyfluoride appears.

The peak height ratio (B/A) of the peak height (B) to the peak height (A) was 0.33. Further, in the X-ray diffraction analysis, no crystal peak of cerium fluoride was observed.

(4) Further, other physical properties of the main component grains were as follows.

① The crystallite diameter (Scherrer method) was 170 Å.

② The specific surface area of the grains by the BET method (measured by Micro Meritics Flow SorbII 2300, the name of the apparatus, manufactured by Shimadzu Corporation) was 4.0 m²/g.

③ The mechanical strength of the main component grains (the average value of 20 grains having a grain diameter of from 2 to 3 μm) was 38 MPa.

④ Further, the pH of the aqueous slurry (solid content concentration: 10 mass %) of the main component grains was 7.5.

⑤ Further, the measured value of the silica adsorption rate as an important physical value of the main component grains was as large as 58.3%.

Polishing Test

The polishing test was carried out by the same method under the same conditions as in Example 1.

Test Results

The test results are shown in Table 13.

Although no defects such as scratches were observed on the polished surface, the durability for maintaining the polishing rate was substantially low as compared with Example 1.

TABLE 13

| Polishing time (hr) | Concentration of dissolved glass in the slurry (mass %) | Thickness of polished glass (μm/hr) |
|---|---|---|
| 1 | 0.125 | 10.02 |
| 2 | 0.249 | 9.92 |
| 3 | 0.360 | 8.85 |
| 4 | 0.447 | 7.00 |
| 5 | 0.530 | 6.58 |
| 6 | 0.605 | 6.02 |
| 7 | 0.673 | 5.41 |
| 8 | 0.735 | 5.02 |

According to the present invention, with respect to an abrasive comprising, as the main component, a rare earth oxide containing cerium oxide, it is possible to provide an abrasive for polishing glass, which is capable of suppressing a decrease in the polishing rate due to polymerization of dissolved silica thereby to maintain a high polishing rate and yet which provides an excellent polishing quality and high mechanical strength of grains, as shown also by the above Examples and Comparative Example.

Further, according to the present invention, it is possible to provide a novel method for evaluating the polishing quality of an abrasive for polishing glass, which can be suitably used for evaluating, selecting or identifying the polishing ability of such a high quality abrasive for polishing glass.

The entire disclosures of Japanese Patent Application No. 2002-338887 filed on Nov. 22, 2002 and Japanese Patent Application No. 2003-037127 filed on Feb. 14, 2003 including specifications, claims, drawings and summaries are incorporated herein by reference in their entireties.

What is claimed is:

1. A method for evaluating the quality of abrasive grains for polishing glass, which comprises
adding abrasive grains to an aqueous medium comprising silica dissolved therein,
absorbing the silica on the abrasive grains under such a condition that the silica undergoes substantially no polymerization in the aqueous medium, followed by
separating the abrasive grains from the mother liquor, and
measuring the concentration of silica remaining in a mother liquor to measure a silica adsorption rate (η) of silica on the abrasive grains.

2. A method for polishing glass, which comprises:
identifying abrasive grains having a silica adsorption rate (η) as measured by the method as defined in claim 1 having at most a value ($η_0$), and
polishing glass with the selected or identified abrasive grains.

3. The method for polishing glass according to claim 2, wherein the value of $η_0$ is 50%.

4. An abrasive for polishing glass, which is an abrasive comprising, as a main component, a rare earth oxide comprising cerium oxide, wherein the silica adsorption rate (η) on the abrasive grains, as measured by the method as defined in claim 1, is at most 50%.

5. The abrasive for polishing glass according to claim 4, which further comprises a fluorine compound.

6. The abrasive for polishing glass according to claim 4, which further comprises an alkaline earth metal sulfate compound, an alkaline earth metal phosphate compound, or both an alkaline earth metal sulfate compound, and an alkaline earth metal phosphate compound.

7. The abrasive for polishing glass according to claim 5, which further comprises an alkaline earth metal sulfate compound, an alkaline earth metal phosphate compound, or both an alkaline earth metal sulfate compound, and an alkaline earth metal phosphate compound.

8. The abrasive for polishing glass according to claim 6, wherein the alkaline earth metal is at least one member selected from the group consisting of calcium, barium, magnesium and strontium.

9. The method for polishing glass according to claim 2, wherein as the abrasive, the abrasive grains have a grain diameter of from 2 to 3 μm, of which the measured value of the average grain strength by a micro compression testing machine is from 10 to 300 MPa.

10. The abrasive for polishing glass according to claim 4, which comprises abrasive grains having a grain diameter of from 2 to 3 μm, of which the measured value of the average grain strength by a micro compression testing machine is from 10 to 300 MPa.

11. The abrasive for polishing glass according to claim 5, which comprises abrasive grains having a grain diameter of from 2 to 3 μm, of which the measured value of the average grain strength by a micro compression testing machine is from 10 to 300 MPa.

12. The abrasive for polishing glass according to claim 6, which comprises abrasive grains having a grain diameter of from 2 to 3 μm, of which the measured value of the average grain strength by a micro compression testing machine is from 10 to 300 MPa.

13. The abrasive for polishing glass according to claim 4, wherein the silica adsorption rate ($\eta$) on the abrasive grains is at most 40%.

14. The abrasive for polishing glass according to claim 4, wherein the silica adsorption rate ($\eta$) on the abrasive grains is at most 30%.

15. The abrasive for polishing glass according to claim 4, wherein the silica adsorption rate ($\eta$) on the abrasive grains is at most 20%.

* * * * *